United States Patent
Murayama et al.

(10) Patent No.: US 6,556,347 B1
(45) Date of Patent: Apr. 29, 2003

(54) REAR PROJECTION SCREEN

(75) Inventors: Yoshiaki Murayama, Kanagawa (JP);
Hideki Hasegawa, Kanagawa (JP);
Noboru Fujikura, Kanagawa (JP);
Makoto Matsumoto, Kanagawa (JP)

(73) Assignee: Mitsubisi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/466,212

(22) Filed: Dec. 17, 1999

(30) Foreign Application Priority Data

| Dec. 18, 1998 | (JP) | 10-360350 |
|---|---|---|
| Mar. 16, 1999 | (JP) | 11-070818 |
| Mar. 24, 1999 | (JP) | 11-079315 |
| Mar. 24, 1999 | (JP) | 11-079316 |
| Jun. 1, 1999 | (JP) | 11-153707 |
| Aug. 25, 1999 | (JP) | 11-238140 |

(51) Int. Cl.$^7$ .................................................. G03B 21/60
(52) U.S. Cl. ......................................................... 359/453
(58) Field of Search ................................. 359/453, 456, 359/457, 460

(56) References Cited

U.S. PATENT DOCUMENTS

| 3,712,707 A | 1/1973 | Henkes, Jr. ............ 350/122 |
| 4,983,016 A | 1/1991 | Yamamoto ............... 350/126 |
| 5,191,472 A * | 3/1993 | Kurematsu et al. ....... 359/457 |
| 5,196,960 A * | 3/1993 | Matsuzaki et al. ....... 359/453 |
| 5,675,435 A | 10/1997 | Ishii et al. ............ 359/460 |
| 5,724,182 A | 3/1998 | Mitani et al. ........... 359/457 |
| 5,760,955 A * | 6/1998 | Goldenberg et al. ...... 359/56 |
| 5,815,313 A * | 9/1998 | Mitani et al. .......... 359/448 |
| 6,163,402 A * | 12/2000 | Chou et al. ............. 359/460 |
| 6,307,675 B1 * | 10/2001 | Abe et al. .............. 359/457 |

FOREIGN PATENT DOCUMENTS

| JP | 55-12980 | 1/1980 |
| JP | 60-46503 | 3/1985 |
| JP | 61-4762 | 1/1986 |
| JP | 1-172801 | 7/1989 |
| JP | 2-123342 | 5/1990 |
| JP | 2-194058 | 7/1990 |
| JP | 2-199444 | 8/1990 |
| JP | 2-212880 | 8/1990 |
| JP | 3-13931 | 1/1991 |
| JP | 3-168630 | 7/1991 |
| JP | 3-207743 | 9/1991 |
| JP | 5-39401 | 2/1993 |
| JP | 6-107881 | 4/1994 |
| JP | 6-192556 | 7/1994 |
| JP | 7-196815 | 8/1995 |
| JP | 7-207101 | 8/1995 |
| JP | 8-313865 | 11/1996 |
| JP | 8-320407 | 12/1996 |
| JP | 9-244147 | 9/1997 |
| JP | 10-87941 | 4/1998 |
| JP | 10-160911 | 6/1998 |
| JP | 10-301208 | 11/1998 |

* cited by examiner

*Primary Examiner*—Christopher Mahoney
(74) *Attorney, Agent, or Firm*—Morgan, Lewis & Bockius LLP

(57) ABSTRACT

A first light diffusion layer (1) and a second light diffusion layer (2) are provided. The first light diffusion layer (1) is formed by dispersing a first light diffuser (1B) comprising fine particles in a first base material (1A) formed of transparent resin by 20 to 50 wt %, the fine particles of the first light diffuser having a refractive index different from that of the first base material by 0.07 to 0.17 and having a weight average particle diameter of 1 to 12 $\mu$m, and the first light diffusion layer having a thickness of 50 to 200 $\mu$m. The second light diffusion layer (2) is formed by dispersing a second light diffuser (2B) comprising fine particles having a weight average particle diameter of 1 to 12 $\mu$m in a second base material (2A) formed of transparent resin by 0.1 to 10.0 wt %, and the second light diffusion layer having a thickness of 500 to 5000 $\mu$m and a Haze value of 50 to 85%.

12 Claims, 5 Drawing Sheets

REAR PROJECTION SCREEN

TECHNICAL FIELD

The present invention relates to an image display technique, and particularly to a rear projection screen which is suitably used as a screen for a projection television, a microfilm reader or the like. The rear projection screen of the present invention is suitably applicable to a rear projection screen onto which an optical image formed on a light valve (light source) having matrix-arranged picture element portions (that is, having such a structure that picture element portions are arranged in a matrix form) such as an LCD (liquid crystal device) projector or DMD (digital micromirror device) projector is projected.

BACKGROUND TECHNIQUE

For rear projection type televisions, it has been hitherto required that projected images can be brightly viewed in a wide viewing angle range at the viewing side, and rear projection-screens having anisotropy in visual field which are designed to diffuse light broadly particularly in a horizontal direction and diffuse light properly in a vertical direction although the diffusion angle range in the vertical direction is smaller than that in the horizontal direction have been used.

A lenticular lens sheet is known as one of these rear projection screens. In the lenticular lens sheet, lenticular lenses each extending in the vertical direction are arranged in parallel on one surface or both surfaces of a sheet to provide the sheet with a light diffusion property to form a light diffusion sheet, and light diffusing members or light diffuser are contained in the diffusion sheet so that light is broadly diffused in the horizontal direction by the lenticular lenses and also it is diffused to some extent in the vertical direction by the light diffuser.

Besides, a projector using a device for performing a display operation by using a matrix pixel structure such as LCD or DMD in place of CRT has propagated as a projection image source used in combination with the rear projection screen. Such a projectior structurally suffers no geomagnetic effect unlike a CRT projector, and thus it is very preferably used as an image light source for a display device of a computer such as a personal computer or the like which is usually used to display still images. Such a rear projection screen using LCD or DMD as a projector has been required to have new performance because it is also used for a display device having a relatively small area of about 14 to 40 inches, such as a personal computer monitor for viewing images at a relatively near position to the screen of the device.

That is, it has been required (1) to cancel a moire phenomenon or scintillation phenomenon occurring due to the interference between periodical structures of projection pixels and lenticular lenses, (2) to cancel a speckle phenomenon occurring due to the interference between projection light and light diffuser added in the lenticular lenses or due to the glare of minute projections and recesses on the surface of the screen or the diffuser (hereinafter referred to as "speckle"), and (3) to clearly resolve images of conventional VGA, SVGA and further high pixel number graphics of XGA, SXGA, UXGA, etc.

For these performance requirements, the following resolving proposals have been made for not only a rear projection screen for a projector using LCD or DMD, but also a rear projection screen for a projector using CRT or the like.

With respect to (1), each of Japanese Patent Application Laid-open Publication No. Hei-3-168630 and Japanese Patent Application Publication No. Hei-7-117818 proposes a method of canceling the moire phenomenon by optimizing the pitch ratio between the projection pixels and the lenticular lenses, and each of Japanese Patent Application Laid-open Publication No. Hei-2-123342 and Japanese Patent Application Laid-open Publication No. Hei-2-212880 proposes a method of canceling the moire phenomenon by inclining the lenticular lenses relatively to the projection pixels.

As described above, the moire phenomenon occurring due to the periodical structure of the lenticular lenses and the projection pixel pitch can be canceled by optimizing the pitches thereof. However, when the number of pixels is increased to the level of XGA class or SXGA class or more or when an image is projected onto a relatively small screen of about 14 to 40 inches, the pitch of the lenticular lenses must be reduced to a very small value of about 0.1 mm or less to cancel the moire phenomenon because the pitch of the pixels constituting an image projected on the rear projection screen is very small, and thus there are problems that it is very difficult to manufacture a mold for such lenses, it is impossible to transfer the lens shape accurately, and the lifetime of the mold is reduced.

With respect to (2), each of Japanese Patent Application Laid-open Publication No. Hei-8-313865, U.S. Pat. No. 5,675,435, 3,712,707 and Japanese Patent Application Laid-open Publication No. Sho-55-12980 proposes a method of reducing the speckle by dividing a light diffusion layer or grading the concentration of the light diffuser in the thickness direction.

With respect to (3), Japanese Patent Application Laid-open Publication No. Sho-55-12980 discloses that the thickness of the diffusion layer is reduced to 100 $\mu$m or less to obtain a rear projection screen having resolving power higher than that of the human eyes (5 to 10 lines/mm).

However, any of the above prior arts cannot satisfy all of the performance requirements (1) to (3). Particularly, the reduction of the speckle in (2) and the high resolving power in (3) are in tradeoff relationship with each other. If the reduction of the speckle is attempted, the resolving power is reduced. If the resolving power is increased, the speckle is more remarkable. For example, in Japanese Patent Application Laid-open Publication No. Hei-8-313865, the speckle can be reduced by dividing a light diffusion layer and setting the distance from the light incident face of a first light diffusion layer to the light emission face of a second light diffusion layer to 1.5 mm or more. However, in the case of the high pixel number such as XGA, SXGA class or higher case, the resolving power is reduced and thus a projected image of high resolution cannot be provided. Further, if the thickness of the diffusion layer is reduced to 100 $\mu$m or less as in the case of Japanese Patent Application Laid-open Publication No. Sho-55-12980, occurrence of speckle is remarkable although a projected image of high resolution is obtained, and thus a high quality projection cannot be provided.

Further, a sheet which is formed of methacrylic resin, polycarbonate resin or the like and contains an inorganic or organic light diffuser is generally used as a light diffusion sheet used for such a rear projection screen or the like.

The light diffuser is required to have the following characteristics: it enhances the light diffusion performance of the light diffusion sheet and the rear projection screen and has high total-light transmittance and a high light using efficiency; it has proper color temperature; and it exhibits neither the see-through feature that a light source image such as a lamp image, CRT or liquid crystal projector is seen through the screen nor the hot band that striped bright portions are partially viewed.

As the light diffuser having the above characteristics are used inorganic light diffuser such as silica, muscovite, alumina, calcium carbonate, glass beads or the like as disclosed in Japanese Patent Application Laid-open Publication No. Sho-60-46503, or resin beads of acrylic resin or styrene resin as disclosed in Japanese Patent Application Laid-open Publication No. Sho-61-4762.

In order to keep the light transmission and the light diffusion in balance, there have been proposed various light diffusion sheets and various compositions using silicone-based light diffuser. Examples thereof are as follows: a light diffusion plate composed of transparent resin dispersed with light diffuser which is made of spherical, solid silicone resin, has a size of 0.3 to 10 $\mu$m and has polysiloxane coupling, as disclosed in Japanese Patent Application Laid-open Publication No. Hei-1-172801; a light diffusing synthetic resin composed of transparent synthetic resin dispersed with silicone resin fine particles of 1 to 6 $\mu$m and inorganic transparent powder, as disclosed in Japanese Patent Application Laid-open Publication No. Hei-2-194058; a molded product composed of methacrylic resin and polymethylsilsesquioxane particles of 0.5 to 20 $\mu$m, as disclosed in Japanese Patent Application Laid-open Publication No. Hei-3-207743; a light diffusing resin composition composed of methacrylic resin and spherical silicone resin having phenyl groups, as disclosed in Japanese Patent Application Laid-open Publication No. Hei-5-39401; a light diffusing resin composed of methacrylic resin, crosslinked methacrylic resin fine particles and silicone fine particles of 1 to 20 $\mu$m, as disclosed in Japanese Patent Application Laid-open Publication No. Hei-6-107881; a light diffusing resin composition composed of polycarbonate and polymethylsilsesquioxane particles, as disclosed in Japanese Patent Application Laid-open Publication No. Hei-6-192556; a light diffusing resin composition composed of polymer mainly containing methylmethacrylate dispersed with liquid polysiloxane, as disclosed in Japanese Patent Application Laid-open Publication No. Hei-7-207101; a light diffusion resin composition composed of acrylic resin and silicone rubber powder, as disclosed in Japanese Patent Application Laid-open Publication No. Hei-10-87941.

However, the light diffusing sheet containing inorganic light diffuser such as glass beads disclosed in Japanese Patent Application Laid-open Publication No. Sho-60-46503 and the light diffusing sheet containing light diffuser composed of silicon resin having high hardness as disclosed in Japanese Patent Application Laid-open Publication No. Hei-1-172801 and so on have such a problem that the strength of the transparent resin serving as a base member is lowered. Particularly when they are used as a light diffusion layer of a rear projection screen to which high resolution is required, the thickness of the light diffusion layer must be reduced to 1.5 mm or less, and it is necessary to increase the content of light diffuser in order to obtain a wide visual field as the thickness of the light diffusion layer is reduced. However, since such a light diffusion layer has a small thickness and contains a large amount of light diffuser, it is very difficult to manufacture the light diffusion layer, and also it is very difficult or cumbersome to handle the diffusion layer when it is carried or fabricated. In addition, it is easily cracked due to an external shock even after it is set up.

When a light diffusing sheet is formed by an extrusion method using resin containing light diffuser, there are problems that the resin is liable to be accumulated at a portion (lip portion) through which the resin is jetted from a die, the light diffusing sheet comes into contact with the portion at which the resin is accumulated, thereby easily inducing appearance defect, and it is difficult to manufacture the light diffusing sheets stably for a long term.

Further, the degradation of the shock resistance of the light diffusion sheet and the occurrence of the appearance defect can be suppressed to some extent by using the rubber silicone light diffuser as disclosed in Japanese Patent Application Laid-open Publication No. Hei-10-87941. However, when the rubber light diffuser is used, agglomeration of rubber particles is remarkable and thus dispersibility into the base resin is degraded.

SUMMARY OF THE INVENTION

Therefore, the present invention has an object to provide a rear projection screen which can obtain a high-quality projected image with high resolution while moire and speckle occur hardly when being used in combination with a liquid crystal projector, etc.

Further, the present invention has another object to provide a rear projection screen which has a sufficiently wide angle of visual field and is excellent in shock resistance and light transmission.

That is, according to a first aspect of the present invention, a rear projection screen onto which an optical image formed on a light valve having picture element portions arranged in a matrix form is projected, is characterized by comprising at least a first light diffusion layer and a second light diffusion layer, wherein the first light diffusion layer comprises a first base material formed of transparent resin and a first light diffuser formed of transparent fine particles contained in the first base material by 20 to 50 wt %, the difference in refractive index between the first base material and the first light diffuser being equal to 0.07 to 0.17, the weight average particle diameter of the first light diffuser being equal to 1 to 12 $\mu$m, the thickness of the first light diffusion layer being set to 50 to 200 $\mu$m, and the second light diffusion layer comprises a second base material formed of transparent resin and a second light diffuser which is formed of transparent fine particles having a weight average particle diameter of 1 to 12 $\mu$m, the thickness of the second light diffusion layer being set to 500 to 5000 $\mu$m and the haze value of the second light diffusion layer being set to 50 to 85%.

According to a second aspect of the present invention, a rear projection screen onto which an optical image formed on a light valve having picture element portions arranged in a matrix form is projected, is characterized by comprising at least a first light diffusion layer and a second light diffusion layer, wherein the first light diffusion layer comprises a first base material formed of transparent resin and a first light diffuser formed of transparent fine particles contained in the first base material by 20 to 50 wt %, the difference in refractive index between the first base material and the first light diffuser being equal to 0.07 to 0.17, the weight average particle diameter of the first light diffuser being equal to 1 to 12 $\mu$m, the thickness of the first light diffusion layer being set to 50 to 200 $\mu$m, and the second light diffusion layer comprises a second base material formed of transparent resin and a second light diffuser which is contained in the second base material by 0.1 to 10.0 wt % and formed of transparent fine particles having a weight average particle diameter of 1 to 12 $\mu$m, the thickness of the second light diffusion layer being set to 500 to 5000 $\mu$m.

According to a third aspect of the present invention, a rear projection screen onto which an optical image is projected by projected light, is characterized in that a polarizing film layer having a polarization degree of 96% or more is disposed between a first light diffusion layer and a second light diffusion layer, and the first light diffusion layer, the polarizing film layer and the second light diffusion layer are laminated.

According to a fourth aspect of the present invention, a rear projection screen onto which an optical image formed on a light valve having picture element portions arranged in a matrix form is projected, is characterized-by including: a light diffusion layer of 0.3 to 1.2 mm in thickness which comprises a transparent resin and light diffuser having a refractive index different from that of the transparent resin by 0.05 or more and a volume average particle diameter of 1 to 8 $\mu$m, the light diffuser being dispersed at a concentration of 10 $g/m^2$ to 60 $g/m^2$ in the transparent resin; and a polarizing film layer.

According to a fifth aspect of the present invention, a rear projection screen onto which an optical image is projected by projected light, is characterized in that a polarizing film layer having a polarizing degree of 96% or more is disposed between a light diffusion layer and a transparent plastic layer, and the light diffusion layer, the transparent plastic layer and the polarizing film layer are laminated.

A rear projection screen according to a sixth aspect of the present invention, is characterized by including a light diffusing sheet in which light diffusing coated particles of a volume average particle diameter of 1 to 8 $\mu$m having a resin layer on the surface of each of silicone rubber spherical fine particles are contained at a concentration of 0.01 to 100 $g/m^2$ in a transparent resin having a refractive index different from that of the silicone rubber spherical fine particles by 0.06 or more.

Figure 1:
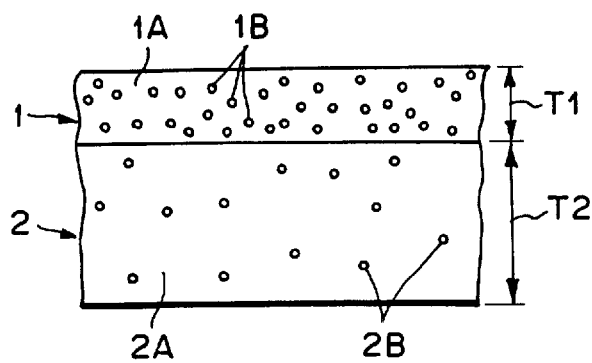
FIG. 1 is a schematic partial cross-sectional view showing the construction of an embodiment of a rear projection screen according to the present invention.

In the drawings, reference numerals are as follows:

1, 7 represent a first light diffusion layer, 1B, 2B, 7B, 11B represent a light diffuser, 2, 11 represent a second light diffusion layer, 4, 21 represent a Fresnel lens, 5, 12, 16 represent a transparent plastic layer, 6, 9, 15 represent a polarizing film layer, 13 represents a light diffusion layer, 13B represents a light diffuser, and 17 represents an antireflection layer.

BEST MODES CARRYING OF THE INVENTION

Embodiments according to the present invention will be described with reference to the accompanying drawings.

Embodiments of First Aspect of the Invention and Embodiments of Second Aspect of the Invention FIG. 1 is a schematic partial cross-sectional view showing the construction of embodiments of a first aspect and a second aspect of a rear projection screen according to the present invention.

In FIG. 1, first light diffusion layer 1 and second light diffusion layer 2 are laminated on each other so as to be mutually adjacent to each other. The first light diffusion layer 1 is composed of first base material 1A formed of transparent resin and first light diffuser 1B contained in the first base material 1A. The second light diffusion layer 2 is composed of second base material 2A formed of transparent resin and second light diffuser 2B contained in the second base material 2A.

According to the rear projection screen of the present invention thus constructed, even when an optical image formed on a light valve having picture element portions arranged in a matrix form such as a liquid crystal projector or DMD projector is projected onto the screen, moire and speckle occur hardly, a high-quality projection image can be obtained with a sufficiently satisfactory angle of visual field and high resolution, and the cost can be reduced.

Here, the resolution of the rear projection screen will be described. In general, the resolution of the rear projection screen is represented by MTF (Modulation Transfer Function) value, and it is measured by using a rectangular grid pattern in which line pairs (its minuteness is indicated by the number of pairs per 1 mm [1 p/mm]) each comprising a white line and a black line arranged alternately are continuously arranged, and it has been found that the MTF value is preferably equal to about 12% or more at 4[1 p/mm] as the resolution of the rear projection screen of the present invention particularly in a high pixel number screen of XGA class, SXGA class or higher classes or a relatively small rear projection screen of about 14 to 40 inches.

Transparent thermoplastic resin such as acrylic resin, styrene resin, polycarbonate resin, polymethylpentene resin, methylmethacrylate/styrene copolymer resin or the like may be used as the first base material 1A and the second base material 2A. When it is used in combination with LCD as a light valve, acrylic resin of small birefringence which does not lower the polarizing characteristic of LCD is most preferable in the above materials. Further, acrylic resin is most preferably used in consideration of the fact that it has high shock resistance. The first and second base materials 1A and 2A may be formed of different resin materials, however, it is preferable that the first base material 1A and the second base material 2A are formed of the same material in order to prevent occurrence of warping and peeling-off of the base materials due to the difference in characteristic between the different materials.

As the first light diffuser 1B and the second light diffuser 2B may be used an inorganic material such as silica, alumina, glass beads or the like or an organic material such as acrylic resin, styrene resin, silicone resin or the like (particularly a crosslinked organic material is more preferable). However, an organic material whose specific gravity is close to that of the base material is more preferable to prevent precipitation of the first light diffuser 1B in the first base material 1B and precipitation of the second light diffuser 2B in the second base material 2A when manufacturing the first and second light diffusion layers 1 and 2 so as to perform uniform dispersion of the light diffusers.

The shape of the first light diffuser 1B and the second light diffuser 2B may be undefined, spherical, flat, spheroidal (ellipsoid of revolution) or the like, and it is not limited to the specific shape. However, when it is used in combination with a light valve using polarized light of LCD or the like, a spherical shape is more preferably used because it does not lower the polarizing characteristic (polarization degree P as described later) of LCD or the like.

The particle diameter of each of the first light diffuser 1B and the second light diffuser 2B is required to be in the range of 1 to 12 $\mu$m in terms of the weight average particle diameter. If the weight average particle diameter of the light diffuser is less than 1 $\mu$m, there is such a tendency that transmitted light is colored with yellow due to scattering or see-through phenomenon occurs. On the other hand, if the weight average particle diameter is more than 12 $\mu$m, there is such a tendency that a required addition amount is excessively increased to obtain desired light diffusion property, so that it is difficult to manufacture and handle a film and the strength of the film thus manufactured is lowered. The preferable range of the weight average particle diameter of the light diffuser is from 2 to 10 $\mu$m.

It is required for the first light diffuser 1B contained in the first light diffusion layer 1 that the difference $\Delta n$ in refractive index between the first light diffuser 1B and the first base material 1A is in the range from 0.07 to 0.17. If the refractive index difference $\Delta n$ between the first light diffuser 1B and the first base material 1A is less than 0.17, the light diffusion property is weakened and thus the angle of visual field is narrow. Therefore, if it is attempted to obtain desired diffusion property, there is such a tendency that a required addition amount trend so large that it is difficult to manufacture and handle the film, and also the strength of the film is lowered. The refractive index range from 1.42 (a lower refractive index of silicone resin) to 1.59 (a higher refractive index of polycarbonate resin or styrene resin) may be used as the refractive index of general polymer used as the first base material 1A and the first light diffuser 1B. By using these materials for the base material and the light diffuser in combination, the refractive index difference $\Delta n$ may be equal to about 0.17 at maximum, and preferably 0.15 or less.

The light diffuser 1B is contained in the first light diffusion layer 1 by 20 to 50 wt %. If the content of the first light diffuser 1B is less than 20 wt %, there is such a tendency that the light diffusion property is weakened and a sufficient visual angle cannot be obtained. If the content of the first light diffuser 1B is more than 50 wt %, the light diffusion property is excessively intensified, and thus there is such a tendency that the total-light transmittance is lowered, it is difficult to manufacture and handle the film and the strength of the film is lowered. The content of the first light diffuser 1B is preferably in the range from 25 to 45 wt %.

The thickness T1 of the first light diffusion layer 1 is required to be in the range from 50 to 200 $\mu$m. If T1 is less than 50 $\mu$m, there is such a tendency that the strength is lowered and it is difficult to add the light diffuser of 20 wt % or more in order to obtain desired light diffusion property. If T1 exceeds 200 $\mu$m, there is such a tendency that the resolution of the rear projection screen is lowered. The thickness T1 of the first light diffusion layer 1 is preferably in the range from 50 to 150 $\mu$m, and more preferably in the range from 55 to 100 $\mu$m.

The second light diffuser 2B is contained in the second light diffusion layer 2 by 0.1 to 10 wt %. The content of the second light diffuser 2B in the second light diffusion layer 2 in the above range makes it possible that the Haze value of the second light diffusion layer 2 satisfies 50 to 85%. The Haze value of the second light diffusion layer 2 is preferably in the range from 55 to 80%, and more preferably in the range from 57 to 75%. If the content of the second light diffuser 2B is less than 0.1 wt % or the Haze value of the second light diffusion layer 2 is less than 50%, there is such a tendency that it is insufficient to cancel the speckle. If the content of the second light diffuser 2B exceeds 10 wt % or the Haze value of the second light diffusion layer 2 exceeds 85%, there is such a tendency that the resolution of the rear projection screen is lowered. The content of the second light diffuser 2B is preferably in the range from 0.5 to 7 wt %, and more preferably in the range from 1 to 5 wt %. With respect to the refractive index of the second light diffuser 2B contained in the second light diffusion layer 2, the refractive index difference $\Delta n$ between the second light diffuser 2B and the second base material 2A is not limited to a specific value, however, it is preferably in the range from 0.01 to 0.1.

The thickness T2 of the second light diffusion layer 2 is required to be in the range from 500 to 5000 $\mu$m. If T2 is less than 500 $\mu$m, there is such a tendency that speckle occurs and the strength of the screen is lowered. If T2 is more than 5000 $\mu$m, there is such a tendency that the resolution of the rear projection screen is lowered. According to the present invention, by setting the thickness T2 of the second light diffusion layer 2 to 500 to 5000 $\mu$m, the cancel of the speckle and the excellent screen shape retention strength which have been hitherto difficult by using only the first light diffusion layer 1 can be achieved. The thickness T2 of the second light diffusion layer 2 is preferably in the range from 600 to 4000 µm, and more preferably in the range from 700 to 3000 µm. In order to further enhance the strength of the rear projection screen, it may be integral with another transparent plastic film or sheet.

In the present invention, the rear projection screen may be disposed so that the first light diffusion layer 1 is located at the light source side while the second light diffusion layer 2 is located at the viewing (observing) side, or it may be disposed so that the second light diffusion layer 2 is located at the light source side while the first light diffusion layer 1 is located at the viewing side. However, it is preferable that the rear projection screen is disposed so that the second light diffusion layer 2 is located at the viewing side (the same arrangement is preferably applied to the following embodiments).

Next, embodiments of the first aspect and the second aspect of the present invention which are different from the embodiments shown in FIG. 1. In FIGS. 2 to 5, the elements having the same functions as those of FIG. 1 are represented by the same reference numerals.

Figure 2:
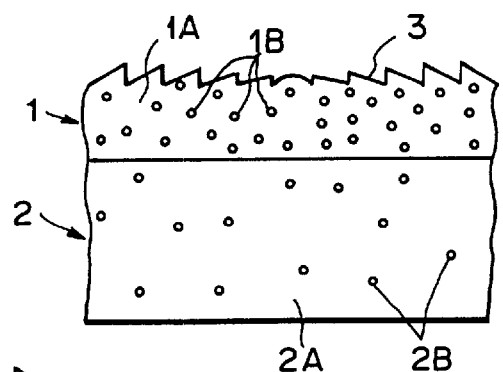
FIG. 2 is a schematic partial cross-sectional view showing the construction of an embodiment of the rear projection screen according to the present invention.

In an embodiment shown in FIG. 2, linear Fresnel lens 3 is formed on the opposite surface of the first light diffusion layer 1 to the second light diffusion layer 2. In this case, the rear projection screen is preferably disposed so that the first light diffusion layer 1 is located at the light source side and the second light diffusion layer 2 is located at the viewing side. By forming the Fresnel lens 3 on the surface of the light source side as described above, a light converging characteristic in the horizontal direction can be provided. Even when a picture or image is viewed from a slant direction, the brightness distribution on the overall screen can be made uniform. Further, the linear Fresnel lens 3 may be formed on the opposite surface of the second light diffusion layer 2 to the first light diffusion layer 1. In this case, the rear projection screen is preferably disposed so that the second light diffusion layer 2 is located at the light source side, and the first light diffusion layer 1 is located at the viewing side.

The provision of the Fresnel lens shape onto the surface of the rear projection screen as described above can be performed by a well-known technique such as a hot press shaping method or a photocure shaping method using active energy curable composition such as ultraviolet curable composition or the like.

Figure 3:
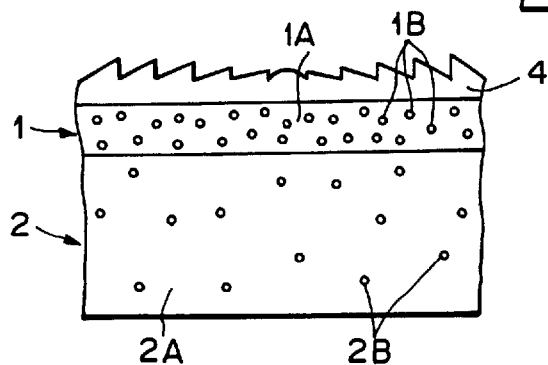
FIG. 3 is a schematic partial cross-sectional view showing the construction of an embodiment of the rear projection screen according to the present invention.

In an embodiment shown in FIG. 3, linear Fresnel lens sheet 4 is joined to the opposite surface (at the light source side) of the first light diffusion layer 1 to the second light diffusion layer 2. In this case, the same action and effect as the embodiment shown in FIG. 2 can be achieved. The linear Fresnel lens sheet 4 may be joined to the opposite surface of the second light diffusion layer 2 to the first light diffusion layer 1. In this case, the rear projection screen is preferably disposed so that the second light diffusion layer 2 is located at the light source side while the first light diffusion layer 1 is located at the viewing side.

Figure 4:
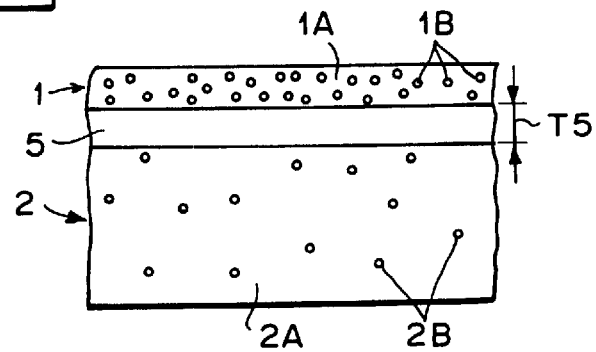
FIG. 4 is a schematic partial cross-sectional view showing the construction of an embodiment of the rear projection screen according to the present invention.

In an embodiment shown in FIG. 4, transparent plastic layer 5 is interposed between the first light diffusion layer 1 and the second light diffusion layer 2. The transparent plastic layer 5 may be formed of the same resin as the first base material 1A constituting the first light diffusion layer 1 or the second base material 2A constituting the second light diffusion layer 2. An air layer may be provided in place of the transparent plastic layer 5. The thickness T5 of the transparent plastic layer 5 is preferably in the range from 100 to 1000 µm. By interposing the transparent plastic layer 5 as described above, the effect of canceling the speckle can be enhanced, and the rigidity of the rear projection screen can be enhanced even when the second light diffusion layer 2 is thin.

Figure 5:
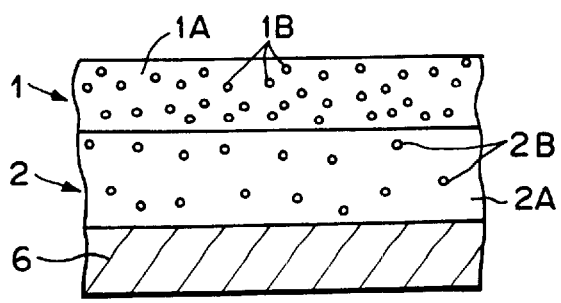
FIG. 5 is a schematic partial cross-sectional view showing the construction of an embodiment of the rear projection screen according to the present invention.

In an embodiment shown in FIG. 5, polarizing film layer 6 is formed on one surface of a laminate containing the first light diffusion layer 1 and the second light diffusion layer 2 (in FIG. 5, the above one surface being the opposite surface of the second light diffusion layer 2 to the first light diffusion layer 1). In this case, the rear projection screen is preferably disposed so that the first light diffusion layer 1 is located at the light source side and the polarizing film layer 6 is located at the viewing side. By providing the polarizing film layer 6 as described above, the loss of the projected light can be suppressed to the minimum. When the screen is used in combination with a light source for projecting an optical image with polarized light like an LCD projector, the degradation of the contrast due to an effect of external light can be effectively suppressed without lowering any other displaying property. The polarized light transmission axis of the polarizing film layer 6 (the direction of polarization of light transmitted through the polarizing film layer 6) is preferably made coincident with (parallel to) the polarization axis of the projected light from the light source (the polarization direction of polarized light).

Generally-used iodine-base materials or dye-based materials may be used for the polarizing film layer 6. The performance/characteristic of the polarizing film is generally represented by transmittance, polarization degree or the like. In the rear projection screen of the present invention, the polarizing film layer 6 is preferably formed of a material having a polarization degree of 96% or more to enhance the contrast without forming a black stripe for enhancing the contrast as in the case of a general rear projection screen. If the polarization degree of the polarizing film layer being used is less than 96%, there is such a tendency that the effect of the enhancing the contrast of the rear projection screen is lowered. The polarization degree of the polarizing film layer is more preferably equal to 97% or more, and further preferably to 99% or more.

In the present invention, light absorber of pigment or dye such as carbon black, neodymium compound or the like may be contained in at least one of the first light diffusion layer 1, the second light diffusion layer 2 and the transparent plastic layer 5 by about 50 to 200 ppm to further enhance the contrast. Further, an antireflection layer may be formed on at least one surface, preferably the viewing-side surface of the rear projection screens having the various constructions as described above to prevent reflection of external light, so that the lowering of the contrast due to the external light can be suppressed. The antireflection layer may be directly formed on the surface of the laminate by deposition or coating of inorganic material, or an antireflection layer may be beforehand formed on the surface of an triacetyl cellulose film, etc. having small birefringence to obtain an antireflection film and then the antireflection film may be attached to the surface of the rear projection screen by adhesive agent. Further, the antireflection can be achieved by forming a non-glare layer or non-glare face.

Embodiments of Third Aspect of the Invention

Figure 6:
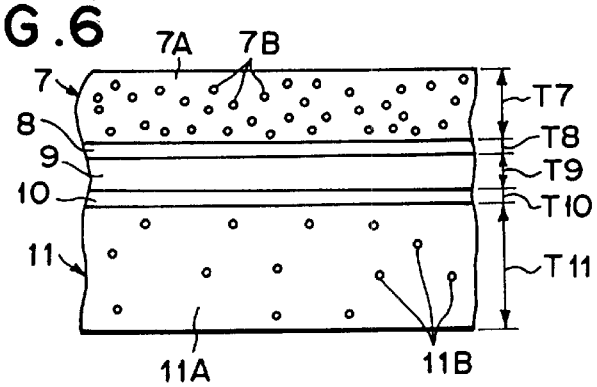
FIG. 6 is a schematic partial cross-sectional view showing the construction of an embodiment of the rear projection screen according to the present invention.

FIG. 6 is a schematic partial cross-sectional view showing the construction of an embodiment of the third aspect of the rear projection screen of the present invention.

In FIG. 6, first light diffusion layer 7 and second light diffusion layer 11 are laminated while polarizing film layer 9 is interposed therebetween. The first light diffusion layer 7 and the polarizing film layer 9 are joined to each other by pressure sensitive adhesive layer 8 and the polarizing film 9 and the second light diffusion layer 11 are joined to each other by pressure sensitive adhesive layer 10. The first light diffusion layer 7, the polarizing film layer 9 and the second light diffusion layer 11 are integral with one another through the adhesive layers 8, 10.

In the present invention, the first light diffusion layer 7, the polarizing film layer 9 and the second light diffusion layer 11 are not necessarily integrally joined to one another. For example, three sheet members are merely overlaid to form a laminate, or the polarizing film layer 9 may be integrally joined to any one of the first light diffusion layer 7 and the second light diffusion layer 11 and then the other light diffusion layer 7,11 may be merely overlaid on the joined laminate.

The first light diffusion layer 7 comprises first base material 7A formed of transparent resin and first light diffuser 7B which has a refractive index different from that of the first base material 7A. Likewise, the second light diffusion layer 11 comprises second base material 11A formed of transparent resin and second light diffuser 11B which has a refractive index different from that of the second base material 11A.

For the first base material 7A and the second base material 11A are preferably used the same transparent thermoplastic resin materials as the first base material 1A and the second base material 2A in the embodiments of the first and second aspects of the present invention. Further, the first base material 7A and the second base material 11A are preferably formed of the same resin. If the first light diffusion layer 7 and the second light diffusion layer 11 which are joined to both the sides of the polarizing film layer 9 are formed of the base material of the same resin, deformation such as warping of the rear projection screen due to an environmental variation such as temperature variation, humidity variation or the like can be effectively suppressed, and high reliability can be maintained.

With respect to the first light diffuser 7B and the second light diffuser 11B, the same light diffusers as the first light diffuser 1B and the second light diffuser 2B in the embodiments of the first and second aspects of the present invention are preferably used.

Accordingly, for the first light diffusion layer 7 and the second light diffusion layer 11 may be used the same light diffusion layers as the first light diffusion layer 1 and the second light diffusion layer 2, respectively, in the embodiments of the first and second aspects of the present invention. However, the thickness T11 of the second light diffusion layer 11 is preferably equal to 500 to 1200 μm.

The same material as the embodiments of the first and second aspects is used for the polarizing film layer 9. When the image is projected by using a light valve having a polarization axis in a specific direction such as LCD or the like, it is preferable that the polarized light transmission axis of the polarizing film layer 9 is made coincident with the direction of the polarization axis of the projected light from the light valve.

The adhesion of the polarizing film layer 9 and each of the first light diffusion layer 7 and the second light diffusion layer 11 can be easily performed by forming transparent pressure sensitive adhesive layers on both the surfaces of the polarizing film layer 9 in advance or forming a transparent pressure sensitive adhesive layer on one surface of each of the first light diffusion layer 7 and the second light diffusion layer 11 in advance. Any material may be used as the pressure sensitive adhesive layer material insofar as it has adhesion to both the layers to be adhered and transparency. Further, it may be colorless or colored, and a pressure-sensitive type adhesive, water borne adhesive, UV curing type adhesive or the like may be used as the pressure sensitive adhesive material. The thickness T8, T10 of the pressure sensitive adhesive layer 8, 10 is preferably set to about 5 to 50 μm, for example.

In the present invention, the distance (T7+T8+T9+T10+T11) from the outer surface of the first light diffusion layer 7 to the outer surface of the second light diffusion layer 11 is preferably less than 1.5 mm. It has been found that the MTF value of the rear projection screen is required to be 12% or more in order to obtain a projection picture of satisfactory resolution, and the MTF value of the rear projection screen can be set to 12% or more and the high-resolution projection picture can be obtained by setting the distance from the outer surface of the first light diffusion layer 7 to the outer surface of the second light diffusion layer 11 to be less than 1.5 mm.

In the present invention, the rear projection screen may be disposed so that the first light diffusion layer 7 is located at the light source side, and the second light diffusion layer 11 is located at the viewing side or so that the second light diffusion layer 11 is located at the light source side and the first light diffusion layer 7 is located at the viewing side. However, it is preferable that the second diffusion layer 11 is set as the viewing side because the contrast enhancing effect of the polarizing film layer 9 is further enhanced.

Figure 7:
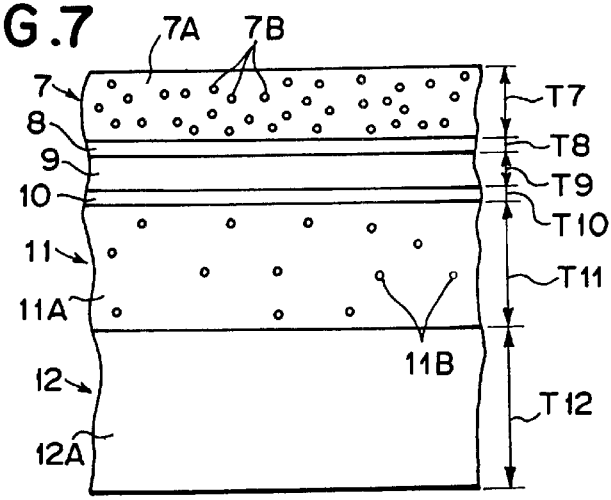
FIG. 7 is a schematic partial cross-sectional view showing the construction of an embodiment of the rear projection screen according to the present invention.
Figure 8:
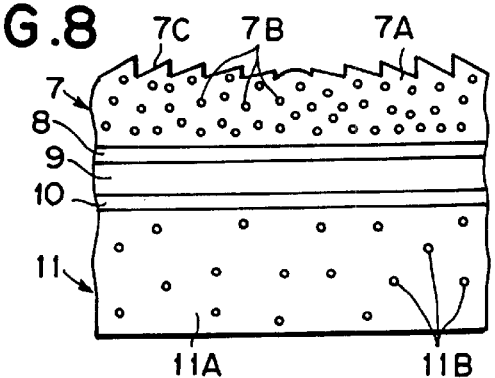
FIG. 8 is a schematic partial cross-sectional view showing the construction of an embodiment of the rear projection screen according to the present invention.
Figure 9:
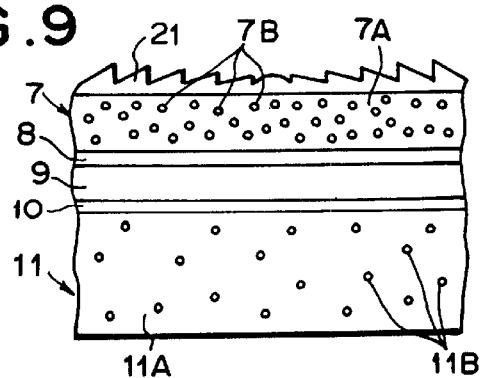
FIG. 9 is a schematic partial cross-sectional view showing the construction of an embodiment of the rear projection screen according to the present invention.

Next, embodiments of the third aspect of the present invention which are different from the embodiment shown in FIG. 6 will be described with reference to FIGS. 7 to 9. In FIGS. 7 to 9, the elements having the same functions as those shown in FIG. 6 are represented by the same reference numerals.

In an embodiment shown in FIG. 7, transparent plastic layer 12 is integrally laminated on the opposite surface (viewing side) of the second light diffusion layer 11 to the polarizing film layer 9. The transparent plastic layer 12 is formed of transparent plastic base material 12A, and contains no light diffuser. The thickness T12 of the transparent plastic layer 12 is set to about 500 to 10000 μm. The transparent plastic base material 12A may be different from the first base material 7A and the second base material 11A, however, it is preferably formed of the same material as the first and second base materials 7A and 11A in order to prevent warping and exfoliation in the screen due to the difference between the base materials.

The rigidity of the rear projection screen can be enhanced without lowering the resolution of the rear projection screen by laminating the transparent plastic layer 12 containing no light diffuser. Light absorber such as pigment or dye such as carbon black, neodymium compound or the like may be contained at a concentration of 50 to 200 ppm in the transparent plastic layer 12 to further enhance the contrast of the rear projection screen.

The transparent plastic layer 12 and the second light diffusion layer 11 may be integrally joined to each other by adhesion using adhesive agent, adhesion using hot press molding or a co-extrusion method.

In an embodiment shown in FIG. 8, linear Fresnel lens 7C is formed on the opposite surface (light source side) of the first light diffusion layer 7 to the polarizing film layer 9. By providing the linear Fresnel lens 7C to the surface at the light source side as described above, the light converging characteristic in the horizontal direction can be provided. Even when a picture is viewed from a slant direction, the brightness distribution of the overall screen can be made uniform. In this case, the rear projection screen is preferably disposed so that the first light diffusion layer 7 is located at the light source side, and the second light diffusion layer 11 is located at the viewing side. Further, the linear Fresnel lens may be formed on the opposite surface of the second light diffusion layer 11 to the polarizing film layer 9. In this case, the rear projection screen is preferably disposed so that the second light diffusion layer 11 is located at the light source side and the first light diffusion layer 7 is located at the viewing side.

In an embodiment shown in FIG. 9, linear Fresnel lens sheet 21 is joined to the opposite surface (light source side) of the first light diffusion layer 7 to the polarizing film layer 9. This construction can also achieve the same effect as the embodiment shown in FIG. 8. Conversely, the linear Fresnel lens sheet 21 may be joined to the opposite surface of the second light diffusion layer 11 to the polarizing film layer 9. In this case, the rear projection screen is preferably disposed so that the second light diffusion layer 11 is located at the light source side, and the first light diffusion layer 7 is located at the viewing side.

In the embodiments shown in FIGS. 6 to 9, an antireflection layer may be formed on at least one surface of the rear projection screen as in the case of the embodiments of the first and second aspects of the present invention. Further, the light absorber as described above may be contained in at least one of the first light diffusion layer 7, the second light diffusion layer 11 and the transparent plastic layer 12.

Embodiments of Fourth Aspect of the Invention

Figure 10:
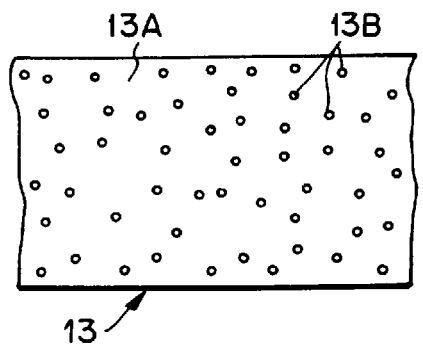
FIG. 10 is a schematic partial cross-sectional view showing the construction of an embodiment of a rear projection screen and a light diffusing sheet according to the present invention.

FIG. 10 is a schematic partial cross-sectional view showing a light diffusion layer constituting a rear projection screen according to a fourth aspect of the present invention.

Light diffuser 13B whose refractive index is different from that of transparent resin constituting light diffusion layer 13 by 0.05 or more and which has a volume average particle diameter of 1 to 8 $\mu$m is contained at a concentration of 10 to 60 g/m$^2$ in the light diffusion layer 13. By constituting the rear projection screen with such a specific light diffusion layer 13, occurrence of speckle can be prevented without lowering the resolution of the projected picture.

The transparent resin 13A may be formed of the same transparent thermoplastic resin as the first base material 1A and the second base material 2A in the embodiments of the first and second aspects. With respect to the light diffuser 13B contained in the light diffusion layer 13, the same light diffusing material as the first light diffuser 1B and the second light diffuser 2B may be suitably selected. The fourth aspect of the present invention is different from the first to third aspects of the present invention in that the light diffusion layer 13 is a single layer.

It is required that the volume average particle diameter of the light diffuser 13B is in the range from 1 to 8 $\mu$m. If the volume average particle diameter of the light diffuser 13B is less than 1 $\mu$m, there is such a tendency that the transmitted light is colored with yellow due to scattering or see-through phenomenon occurs. Conversely, if the volume average particle diameter exceeds 8 $\mu$m, the light diffusion property is lowered and a sufficient angle of visual field cannot be obtained. In addition, if it is intended to obtain desired light diffusion property, the required addition amount of the light diffuser 13B is excessively large and the strength of the light diffusion layer 13 itself is lowered, so that it is difficult to manufacture the light diffusion layer 13 and the resolution of the projected picture is lowered. The volume average particle diameter of the light diffuser 13 is more preferably in the range from 2 to 6 $\mu$m, and still more preferably in the range from 2.5 to 5 $\mu$m.

In the fourth aspect of the present invention, since the rear projection screen is constructed by the light diffusion layer 13 as a single layer, it is required that the difference in refractive index $\Delta$n between the light diffuser 13B and the transparent resin 13A is set to 0.05 or more. If the refractive index difference $\Delta$n is less than 0.05, the light diffusion property is lowered and thus the angle of visual field is reduced. Therefore, if it is intended to obtain desired light diffusion property, the required addition amount of the light diffuser 13B is excessively large and the strength of the light diffusion layer 13 itself is lowered, so that it is difficult to manufacture and handle the light diffusion layer 13, and also the resolution of the projected picture is lowered.

For example, polycarbonate resin or styrene resin having a higher refractive index of about 1.59 and silicone resin having a lower refractive index of about 1.42 may be used as the transparent resin 13A and the light diffuser 13B. By using these resin materials as the transparent resin 13A and the light diffuser 13B in combination, the refractive index difference $\Delta$n can be set to about 0.17 at maximum, and it is preferably set to 0.15 or less. The refractive index difference $\Delta$n between the light diffuser 13A and the transparent resin 13B is preferably in the range from 0.05 to 0.15, and more preferably in the range from 0.06 to 0.1.

The shape of the light diffuser 13B may be undefined, spherical, flat, spheroidal or the like as in the case of the first light diffuser 1B and the second light diffuser 2B. When it is used in combination with a light valve using polarized light such as LCD or the like, a spherical shape is more preferably used because it does not lower the polarizing characteristic of LCD or the like.

The content of the light diffuser 13B in the light diffusion layer 13 is required to be in the range from 10 to 60 g/m$^2$, and the thickness T13 of the light diffusion layer 13 is also required to be in the range from 0.3 to 1.2 mm.

If the content of the light diffuser 13B is less than 10 g/m$^2$, there is such a tendency that the light diffusion property is lowered, so that a sufficient angle of visual field cannot be obtained, and the resolution of the projected picture is lowered. If the content of the light diffuser 13B exceeds 60 g/m$^2$, the light diffusion property is excessively strong, total-light transmittance is lowered and the strength of the light diffusion layer 13 itself is lowered, so that it is difficult to manufacture the light diffusion layer 13 and the resolution of the projected picture is lowered. The content of the light diffuser 13 is preferably in the range from 10 to 50 g/m$^2$, and more preferably in the range from 10 to 45 g/m$^2$.

In the case of the rear projection screen in which the light diffusion layer is constructed by a single layer as described above, if the thickness T13 of the light diffusion layer 13 is less than 0.3 mm, speckle trends to occur intensely. Conversely, if the thickness T13 of the light diffusion layer 13 exceeds 1.2 mm, the resolution of the rear projection screen is lowered. Accordingly, this embodiment can achieve the same resolution and speckle level as the rear projection screen in which the light diffusion layer is formed in a two-layer structure. The thickness T13 of the light diffusion layer 13 is preferably in the range from 0.3 to 1.0 mm, and more preferably in the range from 0.35 to 0.75 mm.

Further, the light diffusion layer 13 is preferably designed to have such a surface structure that minute projections and recesses (minute unevenness) are formed on the surface thereof. The minute unevenness may be formed by an effect of some fine particles added in the sheet on the surface shape of the sheet (for example, fine particles partially project or the like) or by subjecting a surface treatment such as sandblasting, etc. Particularly, when the light diffusion layer 13 is disposed most nearly to the light source, it is desirable that the minute unevenness is formed. By forming the minute unevenness on the surface of the light diffusion layer 13 at the light source side, the regular reflection light come back into the housing of the rear projection screen device can be suppressed to enhance the contrast of the screen, and also it can be suppressed that the external light incident from the surface of the screen at the viewing side is reflected at the interface between the light diffusion layer 13 and the air layer. When the surface roughness is represented by an average slant angle ($\Delta a$), the sectional shape of the minute unevenness is preferably set so that the average slant angle is equal to 0.3 degree or more, and more preferably to 0.5 degree or more.

Next, an embodiment of the rear projection screen formed by using the light diffusion layer 13 as described above will be described with reference to FIGS. 11 to 13.

Figure 11:
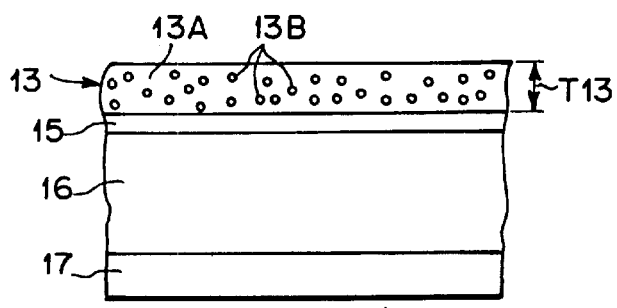
FIG. 11 is a schematic partial cross-sectional view showing the construction of an embodiment of the rear projection screen according to the present invention.

In FIG. 11, the rear projection screen 14 comprises light diffusion layer 13, polarizing film layer 15, transparent plastic layer 16 and antireflection layer 17 which are arranged in this order from the light source side. In the present invention, the light diffusion layer 13, the polarizing film layer 15, the transparent plastic layer 16 and the antireflection layer 17 are preferably integrally joined to one another from the viewpoint of the handling of the rear projection screen. However, these sheets may be merely laminated or stacked, or the light diffusion layer 13 may be laminated or stacked on the integrally joined laminate of the polarizing film layer 15, the transparent plastic layer 16 and the antireflection layer 17.

The same material as the embodiments in the first and second aspects of the present invention may be used as the polarizing film layer 15. The polarizing film layer 15 is integrated with the light diffusion layer 13 and the transparent plastic layer 16 through transparent pressure sensitive adhesive while the polarized light transmission axis of the polarizing film layer 15 is coincident with the polarization axis of the projected light from the light valve.

When the contrast of the rear projection screen is enhanced by using the polarizing film layer 15, as compared with the rear projection screen in which the light diffusion layer is disposed while divided into plural layers, the polarizing film layer 15 is required to be disposed more nearly to the viewing side than the light diffusion layer 13 because the light diffusion layer contains a high-concentration light diffuser. Therefore, some specific kinds of added diffusers may disturb the polarization of the polarized projected light from the light valve when the light passes through the light diffusion layer 13, and the polarization-disturbed light is incident to the polarizing film layer 15, so that the retention P of the polarization degree of the projected light is lowered, resulting in reduction of the brightness of the rear projection screen or coloring of the rear projection screen. However, in the present invention, the formation of the light diffusion layer 13 as described above suppresses the polarization disturbance of the polarized light to the minimum level, so that the retention P of the polarization degree of the projected light is hardly reduced and the reduction in brightness and coloring of the rear projection screen can be prevented.

Figure 15:
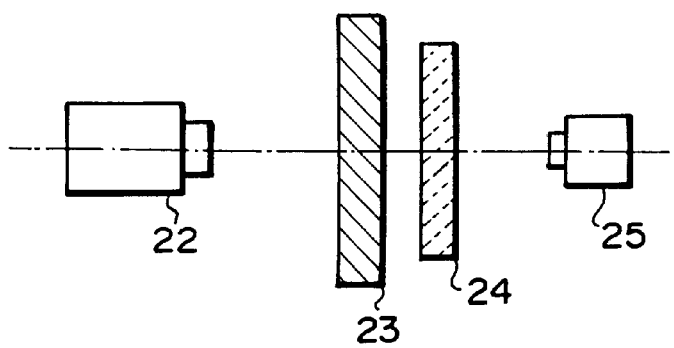
FIG. 15 is a diagram showing a measurement example of the retention of a polarization degree of the rear projection screen according to the present invention.

In the present invention, as shown in FIG. 15, white picture from the light valve 22 is projected onto the rear projection screen 23 comprising the light diffuser 13, and the brightness (Lmax) of light passing through polarizing filter 24 when the polarizing filter 24 is disposed between the rear projection screen 23 and luminance meter 25 so that the polarization axis of the projected light from the light valve 22 is parallel to the polarized light transmission axis of the polarizing filter 24, and the brightness (Lmin) of light passing through the polarizing filter 24 when the polarizing filter 24 is disposed between the rear projection screen 23 and the luminance meter 25 so that the polarization axis of the projection light from the light valve 22 is perpendicular to the polarized light transmission axis of the polarizing filter 24 are measured. In this case, the retention P[%] of the polarization degree is calculated from the following equation (1):

$$P=(L\max-L\min)/(L\max+L\min)\times 100 \quad (1)$$

The retention P of the polarization degree measured under the state that no rear projection screen 23 is provided was equal to about 98%. The retention P of the polarization degree is preferably equal to 85% or more, more preferably to 87% or more, and still more preferably to 90% or more. If the retention P of the polarization degree is less than 85%, there is such a tendency that the brightness of the rear projection screen is reduced and the coloring of the rear projection screen occurs.

The same material as the first and second aspects of the present invention is used as the transparent plastic layer 16, and the same thermoplastic resin as the transparent resin 13A constituting the light diffusion layer 13 is preferably used. Further, in order to further enhance the contrast of the rear projection screen, light absorber such as pigment or dye such as carbon black, neodymium compound or the like may be added at a concentration of about 50 to 200 ppm in the thermoplastic resin constituting the transparent plastic layer 16. The light absorption characteristic to the respective wavelengths may be such a flat absorption characteristic as an ND filter has or a selective absorption characteristic with which light having wavelengths other than the wavelength of the projected light from a light source is selectively absorbed. In this case, the total-light transmittance of the transparent plastic layer 16 is preferably equal to 40 to 80%.

The adhesion of the polarizing film layer 15 and each of the light diffusion layer 13 and the transparent plastic layer 16 may be performed by using transparent pressure sensitive adhesive which is formed in advance on both the surfaces of the polarizing film 15 or on one surface of each of the light diffusion layer 13 and the colorless and transparent or colored transparent plastic sheet 16. Any kind of pressure sensitive adhesive may be used insofar as it has adhesion to both the sheets and is colorless or colored transparent. For example, a pressure-sensitive type adhesive, water borne adhesive, UV curing type adhesive, etc. which are generally used may be suitably selected as the pressure sensitive adhesive. However, it is preferable that the refractive index of the pressure sensitive adhesive is as near to that of the plastic sheets being used as possible in order to suppress the reflection caused at the interface on the basis of the difference in refractive index.

Figure 12:
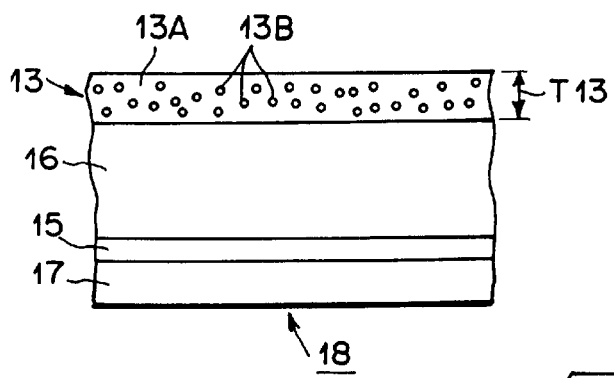
FIG. 12 is a schematic partial cross-sectional view showing the construction of an embodiment of the rear projection screen according to the present invention.

In an embodiment shown in FIG. 12, the rear projection screen comprises antireflection layer 17, polarizing film layer 15, transparent plastic layer 16 and a light diffusion layer 13 which are arranged in this order from the viewing side. In an embodiment shown in FIG. 13, the rear projection screen comprises antireflection layer 17, polarizing film layer 15, light diffusion layer 13 and transparent plastic layer 16 which are arranged in this order from the viewing side.

Figure 16:
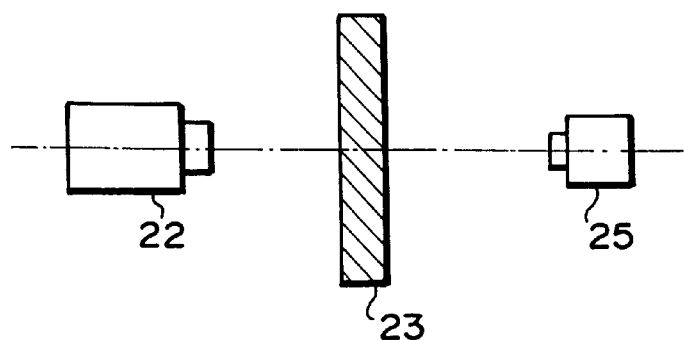
FIG. 16 is a diagram showing a measurement example of the contrast of the rear projection screen according to the present invention.

In the present invention, the brightness (LW) when a white picture from the light valve 22 is projected onto the rear projection screen 23 and the brightness (LB) when a black picture from the light valve 22 is projected onto the rear projection screen 23 are measured by the luminance meter 25 as shown in FIG. 16, and on the basis of the brightness values thus measured, the contrast C of the rear projection screen is given from the equation (2):

$$C=(LW-LB)/(LW+LB) \qquad (2)$$

The brightness is measured under the condition that an illuminator is disposed at the light emission face side of the rear projection screen 23 so that the illuminance of external light on the emission face is equal to 500 Lx.

In the present invention, the contrast C is preferably equal to 0.85 or more, more preferably to 0.87 or more and still more preferably to 0.9 or more.

As in the case of the embodiments of the first and second aspects of the present invention, an antireflection layer may be formed on at least one surface of the rear projection screen, preferably on the viewing-side surface of the rear projection screen to further suppress the reflection of the external light and enhance the contrast of the rear projection screen.

Further, in the rear projection screen thus constructed, a Fresnel lens may be formed on the light-source-side surface or viewing-side surface to provide a light converging characteristic as in the case of the embodiments of the first and second aspects of the present invention. In this case, even when a picture is viewed from an oblique direction, the brightness distribution of the overall screen can be made uniform.

Embodiment of Fifth Aspects of the Invention

Next, an embodiment of the fifth aspect of the present invention will be described. The embodiment of the fifth aspect is directed to a rear projection screen having the same construction as the embodiment of the fourth aspect shown in FIG. 11.

In the embodiment shown in FIG. 11, polarizing film layer 15 is disposed and laminated between light diffusion layer 13 and transparent plastic layer 16, and the light diffusion layer 13 is disposed so as to serve as a light source side. Further, an antireflection layer is formed on the viewing-side surface. The light diffusion layer 13, the polarizing film layer 15, the transparent plastic layer 16 and the antireflection layer 17 are preferably integrally joined to one another from the viewpoint of the handling, etc. of the rear projection screen. However, these sheets may be merely laminated or stacked, or they may be designed so that the light diffusion layer 13 is laminated or stacked on the integrally joined laminate of the polarizing film layer 15, the transparent plastic layer 16 and the antireflection layer 17.

Like the fourth aspect of the present invention, the transparent plastic layer 16, the polarizing film layer 15 and the antireflection layer 17 in FIG. 11 are formed of the same materials as the embodiments of the first and second aspects of the present invention. The light diffusion layer 13 is formed of the same material as the fourth aspect of the present invention. Further, a Fresnel lens may be formed on at least one surface of the rear projection screen as in the case of the fourth aspect of the present invention.

In FIG. 11, the rear projection screen is disposed so that the light diffusion layer 13 is located at the light source side and the transparent plastic layer 16 with the antireflection layer 17 is located at the viewing side. However, the rear projection screen may be disposed so that the transparent plastic layer 16 with the antireflection layer 17 is located at the light source side and the light diffusion layer 1 is located at the viewing side. It is preferable that the transparent plastic layer 16 with the antireflection layer 17 is located at the viewing side because the contrast enhancing effect of the polarizing film layer 15 is higher.

Embodiment of Sixth Aspect of the Invention

Next, an embodiment of the rear projection screen using a light diffusion sheet containing light diffusion coated particles according to the sixth aspect of the present invention.

Figure 17:
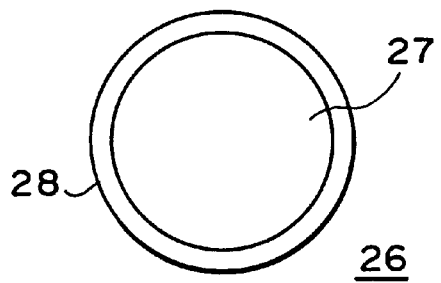
FIG. 17 is a schematic cross-sectional view showing a spherical coated particle of the present invention.

The light diffusion sheet containing the light diffusion coated particles is obtained by adding the light diffusion coated particles to transparent resin. As shown in FIG. 17, the light diffusion coated particle 26 used in the light diffusion sheet is designed in such a core-shell structure that resin layer 28 is coated on the surface of silicone rubber spherical particle 27. The resin layer 28 is preferably formed of hard material, and is particularly preferably formed of polyorganosilsesquioxane resin.

In order to sufficiently exhibit the characteristic of the silicone rubber spherical particle 27, the ratio of the silicone rubber spherical particle 27 and the resin layer 28 is preferably set so that the volume ratio of the silicone rubber spherical particle 27 in the coated particle 26 is equal to 50% or more.

In order to further enhance the shock resistance of the light diffusion sheet, the hardness of the silicone rubber spherical particle 27 constituting the core of the spherical coated particle 26 is preferably less than 60 in terms of JIS A hardness. The silicone rubber spherical particle 27 is relatively softy because the hardness thereof is less than 60, however, the resin layer 28 formed of polyorganosilsesquioxane resin is formed on the surface of the particle 27 and thus the spherical coated particle 26 finally obtained have excellent dispersibility to the transparent resin.

The spherical coated particles 26 as described above can be manufactured by a method disclosed in Japanese Patent Application Laid-open Publication No. Hei-7-196815.

The volume average particle diameter of the spherical coated particles 26 is in the range from 1 to 8 $\mu$m and preferably in the range from 1.5 to 7 $\mu$m. If the volume average particle diameter of the spherical coated particles 26 is less than 1 $\mu$m, the transmitted light is colored with yellow due to scattering or see-through phenomenon is liable to occur. On the other hand, if the volume average particle diameter is larger than 8 $\mu$m, the light diffusion property is degraded. In addition, if it is intended to obtain desired light diffusion property, the required addition amount of the spherical coated particles 26 is excessively large, so that it is difficult to manufacture the light diffusion sheet and the shock resistance is reduced.

In the light diffusion sheet of the present invention, the refractive index difference $\Delta n$ between the silicone rubber spherical particles 27 constituting the spherical coated particles 26 and the transparent resin is equal to 0.06 or more, and preferably to 0.065 or more. If the refractive index difference $\Delta n$ is less than 0.06, the angle of visual field is narrower due to lowering of the light diffusion property, and if it is intended to obtain desired light diffusion property, the required addition amount of the spherical coated particles 26 is excessively large, so that it is difficult to manufacture the light diffusion sheet and the shock resistance is lowered.

Further, the spherical coated particles 26 are dispersed at a content of 0.01 to 100 g/m$^2$ in the transparent resin. The content of the spherical coated particles 26 is suitably determined in the above range in order to exhibit the desired light diffusion property. If the content is less than 0.01 g/m$^2$, the light diffusion property is lowered and thus sufficient light diffusion cannot be achieved. On the other hand, if the content exceeds 100 g/m$^2$, the light diffusion property is excessively intensified, so that the total-light transmittance is lowered, it is difficult to manufacture the light diffusion sheet and the shock resistance is lowered.

In order to enhance the contrast of the light diffusion sheet, light absorber such as pigment or dye such as carbon black, neodymium compound or the like may be suitably selected and added together with the spherical coated particles 26 (for example, about 50 to 200 ppm). The light absorption characteristic of the light absorber is not limited to a specific one, however, a wavelength-dependent selective light absorption characteristic may be provided in accordance with its use purpose.

In the present invention, the thickness of the light diffusion sheet is not limited to a specific value, however, it is preferably set to 1.5 mm or less when the light diffusion sheet is used in a field to which high resolution is required like a rear projection screen.

Any material may be used as the transparent resin constituting the light diffusion sheet insofar as it is transparent resin. For example, as the transparent resin may be used methacrylic resin, styrene resin, copolymer (MS resin) of methacrylate and styrene, polycarbonate resin, vinyl chloride resin or the like. Of these materials, methacrylic resin having high transparency is most preferable. On the other hand, when it is used in a field to which high shock resistance is required, shock-resistant methacrylic is more preferably used.

The light diffusion sheet of the present invention may be used as the light diffusion layer of the embodiments of the first to fifth aspects of the present invention to constitute the rear projection screen, or it may be used as each of various lens sheets obtained by forming a lens such as a lenticular lens, a Fresnel lens, a prism or the like on at least one surface of the light diffusion sheet to construct the rear projection screen.

Figure 14:
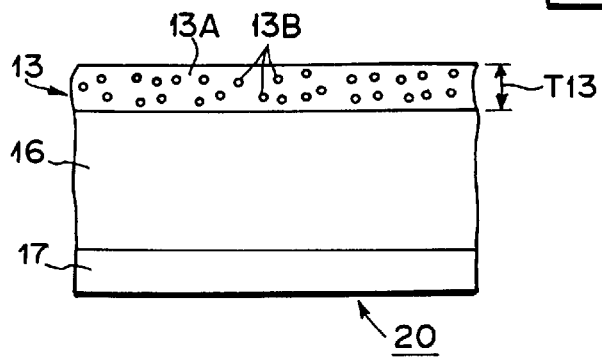
FIG. 14 is a schematic partial cross-sectional view showing the construction of an embodiment of the rear projection screen according to the present invention.

In an embodiment shown in FIG. 14, the rear projection screen comprises antireflection layer 17, transparent plastic layer 16 and a light diffusion layer 13 which are arranged in this order from the viewing side. In this case, since no polarizing film layer is used, it is preferable that light absorber such as pigment or dye such as carbon black, neodymium compound or the like is contained in the transparent plastic layer 16 to enhance the contrast of the rear projection screen. The total-light transmittance of the transparent plastic layer 16 is preferably in the range from 40 to 70%, more preferably in the range from 40 to 65% and still more preferably in the range from 40 to 65%.

In place of the antireflection layer, a glare-proof layer may be formed, and further an antistatic layer, a hard coat layer or a polarizing film layer may be formed.

Next, the present invention will be described on the basis of specific examples, however, the present invention is not limited to the following examples.

The methods of estimating the rear projection screens obtained in the following examples and comparative examples are as follows.

Haze Value

The Haze value was measured by using Haze meter HR-100 produced by Murakami Color Research Laboratory Co., Ltd.

Screen Gain (Go)

Sample was illuminated on one surface thereof under fixed illuminance by liquid crystal projector XVE-500 produced by Sharp Corp. and the brightness on the other surface to the sample was measured by a color luminance meter BM-7 produced by Topcon Corp. The ratio of the illuminance and the brightness was set as a screen gain (Go).

α-value

An angle of visual field at which a half of the screen gain obtained in the above measurement was obtained was set as α.

β-value

An angle of visual field at which one third of the screen gain obtained in the above measurement was obtained was set as β.

Speckle

A white image was projected onto the rear projection screen with the same projector as described above from a position which was far away from the rear projection screen by a distance of 1 m so that the frame size was equal to 30 inches, and then the image was observed with eyes at a distance of 0.5 m from the rear projection screen to judge presence or absence of speckle.

Resolution

The MTF value was measured by a contrast method using a grid of spatial frequency of 4[1 p/mm].

Contrast (C)

A white picture and a black picture were projected onto the center of the rear projection screen from a distance of 1 m by using the same projector as described above so that the frame size was equal to 50 mm in square, and the brightness (LW) for the white frame and the brightness (LB) for the black frame were measured by using a color illuminance meter BM-7 produced by Topcon Corp. from a position which was far away from the rear projection screen by a distance of 1.0 m to calculate the contrast from the equation (2). The external light illuminance on the rear projection screen at the measurement time was set to 500 Lx.

Retention of Polarization Degree

A white picture was projected onto the rear projection screen 23 from the projector 22 by using a measurement apparatus shown in FIG. 15 to measure both the brightness (Lmax) when the polarizing filter 24 was disposed so that the polarization axis of the projected light from the projector 22 was parallel to the polarized light transmission axis of the polarizing filter 24 and the brightness (Lmin) when the polarizing filter 24 was disposed so that the polarization axis of the projected light from the projector 22 was perpendicular to the polarized light transmission axis of the polarizing filter 24, and the retention of the polarization degree were calculated from the equation (1).

Izod Shock Resistance

It was measured according to JIS K7110 to calculate Izod shock resistance ($\alpha_{ki}$).

Drop Impact test

It was measured according to JIS K7211 to calculate 50% destruction energy ($E_{50}$).

EXAMPLE 1

Formation of First Light Diffusion Layer

Acrylic resin pellets (ACRYPET RF-065, produced by Mitsubishi Rayon Co., Ltd.) were added to methyl ethyl ketone (MEK) solvent by 20 wt % and dissolved while stirred, thereby obtaining acrylic resin solution. Crosslinked styrene resin spherical fine particles having a weight average particle diameter of 6 μm (SBX-6, produced by Sekisui Plastics Co., Ltd.: refractive index of 1.59) were added as the light diffuser 7B to the acrylic resin solution by 28.0 wt % with respect to acrylic resin, and stirred and mixed to uniformly disperse the particles in the acrylic resin solution. The acrylic resin solution containing the light diffuser was coated on a glass plate by using a bar coater so that the thickness was equal to 400 μm under non-dried condition. Thereafter, it was heated and dried at 50° C. for 10 minutes, and further at 100° C. for 10 minutes to vaporize the solvent, and the dried result was exfoliated from the glass plate, thereby obtaining the light diffusion film 1 (first light diffusion layer) in which the light diffuser 1B was uniformly dispersed. The thickness of the film 1 was equal to 80 μm. When the film was exfoliated, no crack occurred in the film, and the film could be easily handled. The optical characteristics of the film 1 thus obtained is shown in Table 1.

Formation of Second Light Diffusion Layer

Crosslinked methacrylate/styrene copolymer resin spherical fine particles having a weight average particle diameter of 5 μm (MSH-5, produced by Sekisui Plastics Co., Ltd.: refractive index of 1.53) were added as the light diffuser 2B into partial polymerized composition of methacrylic resin by 1.3 wt % and then the polymerization was carried out to obtain the light diffusion sheet 2 (second light diffusion layer) of 2000 μm in thickness. The light diffuser 2B was uniformly dispersed in the methacrylic resin light diffusion sheet 2 constituting the second light diffusion layer. The optical characteristics of the sheet thus obtained is shown in Table 1.

Lamination of First Light Diffusion Layer and Second Light Diffusion Layer

The first light diffusion layer and the second light diffusion layer thus formed were overlaid on each other, sandwiched between a pair of stainless steel mirror plates of 1 mm in thickness and then subjected to hot press molding to laminate the first light diffusion layer and the second light diffusion layer, thereby obtaining a rear projection screen of 2080 μm in thickness as shown in FIG. 1.

Measurement of Characteristics of Screen

The measurement results of the gain (Go), α-value, β-value, resolution (MTF) of the screen and the observation result of the speckle are shown in Table 2. In the rear projection screen thus obtained, no speckle occurred while the MTF was high (40%), and the α-value was equal to 34 degrees, which indicated that a sufficient angle of visual field was obtained. Accordingly, there could be obtained an image having uniform brightness over the overall image and no unevenness in light and shade. Further, no moire occurred.

EXAMPLE 2

Formation of Second Light Diffusion Layer

Spherical glass beads having an weight average particle diameter of 10 μm (EMB-10, produced by Toshiba Balotini Co., Ltd.: refractive index of 1.52) were added as the light diffuser 2B to methacrylic resin pellets (ACRYPET VH, produced by Mitsubishi Rayon Co., Ltd.) by 2.0 wt %, dispersed by using Henschel mixer, and then acrylic resin pellets contining the light diffuser were formed by using a double screw extruder of 30 mm φ. This pellet was sheeted by using a single screw extruder of 50 mm φ to obtain a second light diffusion layer 2 having a thickness of 2000 μm. The light diffuser was uniformly dispersed in the second light diffusion layer 2. The optical characteristics of the second light diffusion layer thus obtained is shown in Table 1.

Lamination of First Light Diffusion Layer and Second Light Diffusion Layer

The second light diffusion layer thus obtained and the first light diffusion layer obtained in Example 1 were laminated in the same manner as Example 1 to obtain a rear projection screen.

Measurement of Characteristics of Screen

The measurement results of the gain (Go), α-value, β-value, resolution (MTF) of the screen and the observation result of the speckle are shown in Table 2. In the rear projection screen thus obtained, no speckle occurred while the MTF was high (42%), and the α-value was equal to 33.9 degrees, which indicated that a sufficient angle of visual field was obtained. Accordingly, there could be obtained an image having uniform brightness over the overall image and no unevenness in light and shade. Further, no moire occurred.

EXAMPLE 3

A rear projection screen was obtained in the same manner as Example 1 except that spherical silicone resin beads having a weight average particle diameter of 3 μm (TOSPEARL 130 (TP130), produced by Toshiba Silicone Co., Ltd.: refractive index of 1.42) were added as the first light diffuser 1B of the first light diffusion layer 1 by 40 wt %, and the second light diffuser 2B of the second light diffusion layer 2 was added by 1.4 wt %.

The optical characteristics of the first light diffusion layer 1 and the second light diffusion layer 2 are shown in Table 1. The measurement results of the characteristics of the rear projection screen is shown in Table 2. In the rear projection screen thus obtained, no speckle occurred while the resolution (MTF) was high (30%), and the α-value was equal to 36.0 degrees, which indicated that a sufficient angle of visual field was obtained. Accordingly, there could be obtained an image having uniform brightness over the overall image and no unevenness in light and shade. Further, no moire occurred.

EXAMPLE 4

A rear projection screen was obtained in the same manner as Example 1 except that methylmethacrylate/styrene copolymer resin (MS) (TX400, produced by Denki Kagaku Kogyo Kabushiki Kaisha: refractive index of 1.54) was used as the first base material 1A of the first light diffusion layer 1, spherical silicone resin beads having a weight average particle diameter of 4.5 μm (TOSPEARL 145 (TP145), produced by Toshiba Silicone Co., Ltd.: refractive index of 1.42) were added as the first light diffuser 1B by 40 wt %, the same material as the first base material 1A was used as the second base material 2A of the second light diffusion layer 2, and spherical crosslinked methylmethacrylate resin particles having a weight average particle diameter of 8 μm (MBX-8, produced by Sekisui Plastics Co., Ltd.: refractive index of 1.49) were added as the second light diffuser 2B by 1.4 wt %.

The optical characteristics of the first light diffusion layer 1 and the second light diffusion layer 2 are shown in Table 1. The measurement results of the characteristics of the rear projection screen is shown in Table 2. In the rear projection screen thus obtained, no speckle occurred while the resolution (MTF) was high (50%), and the α-value was equal to 32.1 degrees, which indicated that a sufficient angle of visual field was obtained. Accordingly, there could be obtained an image having uniform brightness over the overall image and no unevenness in light and shade. Further, no moire occurred.

Comparative Example 1

The measurement results of the characteristics of a rear projection screen comprising only the first light diffusion layer 1 obtained in Example 1 is shown in Table 2. In this rear projection screen, the resolution (MTF) was high (78%)

and the angle of visual field was sufficient because the α-value was equal to 32.0 degrees. However, strong speckle occurred.

Comparative Example 2

The first light diffusion layer 1 was formed in the same manner as Example 1 except that spherical silicone resin beads having a weight average particle diameter of 0.5 μm (TOSPEARL 105 (TP105), produced by Toshiba Silicone Co., Ltd.: refractive index of 1.42) were added as the first light diffuser 1B by 25 wt %. The optical characteristics and other characteristics of the rear projection screen comprising only the light diffusion layer 1 thus obtained was attempted to be measured, however, it was impossible to measure these characteristics because the particle diameter of the light diffuser was excessively small and thus the light source was seen through the screen.

Comparative Example 3

The first light diffusion layer 1 was formed in the same manner as Example 1 except that crosslinked styrene resin spherical fine particles having a weight average particle diameter of 15 μm (SBX-15, produced by Sekisui Plastics Co., Ltd.: refractive index of 1.59) were added as the first light diffuser 1B by 60 wt %. The optical characteristics and other characteristics of the rear projection screen comprising only the light diffusion layer 1 thus obtained was attempted to be measured. However, since the particle diameter of the light diffuser was excessively large, the first light diffusion layer 1 became fragile and cracks occurred when the light diffuser was added by the amount (60 wt %) so as to obtain the same screen gain as Example 1, so that it was impossible to measure these characteristics.

Comparative Example 4

A rear projection screen was formed in the same manner as Example 1 except that the addition amount of the first light diffuser 1B of the first light diffusion layer 1 was set to 15 wt %, the thickness of the first light diffusion layer 1 after dried was set to 75 μm and crosslinked styrene resin spherical fine particles having a weight average particle diameter of 8 μm (SBX-8, produced by Sekisui Plastics Co., Ltd.: refractive index of 1.59) were added as the second light diffuser 2B of the second light diffusion layer 2 by 0.5 wt %.

The optical characteristics of the first light diffusion layer 1 and the second light diffusion layer 2 are shown in Table 1. The measurement results of the characteristics of the rear projection screen is shown in Table 2. In the rear projection screen thus obtained, the resolution (MTF) was high (65%), and no speckle occurred while the resolution (MTF) was high (65%), and speckle occurred slightly. However, since the addition amount of the first light diffuser 1B was small, the angle of visual field was extremely small because the α-value was equal to 14.0 degrees.

Comparative Example 5

The first light diffusion layer 1 was formed in the same manner as Example 1 except that the addition amount of the first light diffuser 1B was set to 40 wt % and the thickness of the first light diffusion layer 1 after dried was set to 45 μm. The optical characteristics and the other characteristics of the rear projection screen comprising only the first light diffusion layer 1 thus obtained were attempted to be measured. However, since the thickness of the light diffusion layer 1 is excessively small, the first light diffusion layer 1 became fragile and cracks occurred when the light diffuser was added by the amount (40 wt %) so as to obtain the same screen gain as Example 1, so that it was impossible to measure these characteristics.

Comparative Example 6

A rear projection screen was formed in the same manner as Example 1 except that the addition amount of the first light diffuser 1B of the first light diffusion layer 1 was set to 9.3 wt %, the thickness of the first light diffusion layer 1 after dried was set to 250 μm and crosslinked styrene resin spherical fine particles having a weight average particle diameter of 8 μm (SBX-8, produced by Sekisui Plastics Co., Ltd.: refractive index of 1.59) were added as the second light diffuser 2B of the second light diffusion layer 2 by 1.0 wt %.

The optical characteristics of the first light diffusion layer 1 and the second light diffusion layer 2 are shown in Table 1. The measurement results of the characteristics of the rear projection screen is shown in Table 2. The angle of visual field was satisfactory because the α-value was equal to 38.5 degrees, and no speckle occurs. However, since the first light diffusion layer 1 was thick, the resolution (MTF) was equal to an extremely low value of 3%.

Comparative Example 7

A rear projection screen was formed in the same manner as Example 1 except that spherical silicone resin beads having a weight average particle diameter of 4.5 μm (TOSPEARL 145 (TP145), produced by Toshiba Silicone Co., Ltd.: refractive index of 1.42) were added as the second light diffuser 2B of the second light diffusion layer 2 by 0.06 wt % and the thickness thereof was set to 3000 μm.

The optical characteristics of the first light diffusion layer 1 and the second light diffusion layer 2 are shown in Table 1. The measurement results of the characteristics of the rear projection screen is shown in Table 2. The angle of visual field was satisfactory because the α-value was equal to 32.1 degrees, and the resolution (MTF) was high (55%). However, the Haze value of the second light diffusion layer 2 was low (45.0%) and speckle strongly occurred.

Comparative Example 8

A rear projection screen was formed in the same manner as Example 1 except that spherical crosslinked methacrylate/styrene copolymer resin particles having a weight average particle diameter of 5 μm (MSH-5, produced by Sekisui Plastics Co., Ltd.: refractive index of 1.53) were added as the second light diffuser 2B of the second light diffusion layer 2 by 6.2 wt % and the thickness thereof after dried was set to 450 μm.

The optical characteristics of the first light diffusion layer 1 and the second light diffusion layer 2 are shown in Table 1. The measurement results of the characteristics of the rear projection screen is shown in Table 2. The angle of visual field was satisfactory because the α-value was equal to 32.1 degrees, and the resolution (MTF) was high (40%). However, the thickness of the second light diffusion layer 2 was small, and thus the total thickness of the first and second light diffusion layers was equal to 530 μm (small value) and the speckle occurred. In addition, it was difficult to install the rear projection screen to the housing of the projection television.

TABLE 1

| | LIGHT DIFFUSION LAYER | BASE MATERIAL | LIGHT DIFFUSER/ ADDITION AMOUNT (wt %) | REFRACTIVE INDEX DIFFERENCE ΔN | Haze (%) | Go | β-VALUE (DEGREE) | THICKNESS (μm) |
|---|---|---|---|---|---|---|---|---|
| EX. 1 | FIRST | PMMA | SBX-6/28.0 | 0.10 | 89.2 | 1.1 | 45.0 | 80 |
| | SECOND | PMMA | MSH-5/1.3 | 0.04 | 61.9 | 60.0 | 4.3 | 2000 |
| EX. 2 | FIRST | PMMA | SBX-6/28.0 | 0.10 | 89.2 | 1.1 | 45.0 | 80 |
| | SECOND | PMMA | EMB-10/2.0 | 0.03 | 58.0 | 63.0 | 3.8 | 2000 |
| EX. 3 | FIRST | PMMA | TP130/40.0 | 0.07 | 89.2 | 0.9 | 50.0 | 80 |
| | SECOND | PMMA | MSH-5/1.4 | 0.04 | 62.3 | 40.0 | 5.1 | 2000 |
| EX. 4 | FIRST | MS | TP145/40.0 | 0.12 | 89.2 | 1.1 | 47.0 | 60 |
| | SECOND | MS | MBX-8/1.4 | 0.05 | 70.1 | 70.0 | 3.1 | 2000 |
| COMP. EX. 1 | FIRST | PMMA | SBX-6/28.0 | 0.10 | 89.2 | 1.1 | 45.0 | 80 |
| COMP. EX. 2 | FIRST | PMMA | TP-105/25.0 | 0.07 | UNMEASURABLE | | | 80 |
| COMP. EX. 3 | FIRST | PMMA | SBX-15/60.0 | 0.10 | UNMEASURABLE | | | 80 |
| COMP. EX. 4 | FIRST | PMMA | SBX-6/15.0 | 0.10 | 85.7 | 6.3 | 17.8 | 75 |
| | SECOND | PMMA | SBX-8/0.5 | 0.10 | 76.0 | 29.0 | 9.8 | 2000 |
| COMP. EX. 5 | FIRST | PMMA | SBX-6/40.0 | 0.10 | UNMEASURABLE | | | 45 |
| COMP. EX. 6 | FIRST | PMMA | SBX-6/9.3 | 0.10 | 89.2 | 1.1 | 45.0 | 250 |
| | SECOND | PMMA | SBX-8/1.0 | 0.10 | 84.4 | 9.5 | 16.9 | 2000 |
| COMP. EX. 7 | FIRST | PMMA | SBX-6/28.0 | 0.10 | 89.2 | 1.1 | 45.0 | 80 |
| | SECOND | PMMA | TP-145/0.06 | 0.07 | 45.0 | 252.0 | 2.0 | 3000 |
| COMP. EX. 8 | FIRST | PMMA | SBX-6/28.0 | 0.10 | 89.2 | 1.1 | 45.0 | 80 |
| | SECOND | PMMA | MSH-5/6.2 | 0.04 | 61.9 | 60.0 | 43 | 450 |

TABLE 2

| | Go | α-VALUE (DEGREE) | β-VALUE (DEGREE) | MTF (%) | OCCURRENCE OF SPECKLE |
|---|---|---|---|---|---|
| EX. 1 | 1.0 | 34.0 | 46.0 | 40 | NO |
| EX. 2 | 1.0 | 33.9 | 45.0 | 42 | NO |
| EX. 3 | 0.9 | 36.0 | 47.0 | 30 | NO |
| EX. 4 | 1.1 | 32.1 | 43.0 | 50 | NO |
| COMP. EX. 1 | 1.1 | 32.0 | 45.0 | 78 | STRONGLY OCCURRING |
| COMP. EX. 4 | 4.5 | 14.0 | 18.3 | 65 | SLIGHTLY OCCURRING |
| COMP. EX. 6 | 0.7 | 38.5 | 53.2 | 3 | NO |
| COMP. EX. 7 | 1.1 | 32.1 | 42.9 | 55 | STRONGLY OCCURRING |
| COMP. EX. 8 | 1.1 | 32.1 | 42.9 | 40 | OCCURRING |

EXAMPLE 5 he first light diffusion layer 1 and the second light diffusion layer 2 obtained in Example 1 were overlaid on each other, and the laminate thus formed was pinched by a stainless steel mirror plate and a mold having a surface for forming linear Fresnel lens having a focal length of 520 mm so that one surface of the laminate was brought into contact with the stainless steel mirror plate and the other surface thereof was brought into contact with the mold surface. Finally, the laminate was subjected to hot press molding to obtain a rear projection screen having a thickness of 2080 μm as shown in FIG. 2.

The rear projection screen thus obtained exhibited the same optical characteristics as those of Example 1 with the exception of the light converging characteristic based on the linear Fresnel lens. Since the light convergence to the viewing side is carried out due to the formation of the Fresnel lens, an image display can be performed so that the brightness difference between the center portion of the frame (screen) and the four corners thereof is remarkably small.

EXAMPLE 6

A polarizing film having pressure sensitive adhesive coated on one surface thereof (NPF-F1220DU, produced by Nitto Denko Corp.: transmittance of 41%: polarization degree of 99.8%) was joined and laminated onto the viewing-side (the second light diffusion layer side) of the rear projection screen obtained in Example 1 through the pressure sensitive adhesive so that the polarized light transmission axis of the polarizing film is parallel to the polarization axis of projected light from an LCD projector, thereby obtaining a rear projection screen having a thickness of 2280 μm as shown in FIG. 5.

The rear projection screen thus obtained had the same optical characteristics as those of Example 1 with the exception of the polarization characteristic based on the polarizing film. Since the polarizing film was attached with matching the transmission axis to the polarization axis of light, the amount of the external light could be intercepted by a half while keeping the loss of the projected light small, so that an image can be displayed with very high contrast. As a result of checking the polarization characteristic of a liquid crystal projector XVE-500 produced by Sharp Corp. used for the estimation, one linearly polarized light was projected.

EXAMPLE 7

Formation of First Light Diffusion Layer

Acrylic resin pellets (ACRYPET RF-065, produced by Mitsubishi Rayon Co., Ltd.) were added to methyl ethyl ketone (MEK) solvent by 20 wt % and dissolved while stirred, thereby obtaining acrylic resin solution. Crosslinked styrene resin spherical fine particles having a weight average particle diameter of 6 μm (SBX-6, produced by Sekisui Plastics Co., Ltd.: refractive index of 1.59) were added as the light diffuser 7B to the acrylic resin solution by 28.0 wt % with respect to acrylic resin, and stirred and mixed to uniformly disperse the particles in the acrylic resin solution. The acrylic resin solution containing the light diffuser was coated on a glass plate by using a bar coater so that the thickness was equal to 400 μm under non-dried condition. Thereafter, it was heated and dried at 50° C. for 10 minutes, and further at 100° C. for 10 minutes to vaporize the solvent, and the dried result was exfoliated from the glass plate, thereby obtaining the light diffusion film 7 (first light diffusion layer) in which the light diffuser was uniformly dispersed. The thickness of the film constituting the first light diffusion layer 7 was equal to 80 μm. When the film was exfoliated, no crack occurred in the film, and the film could be easily handled. The optical characteristics of the light diffusion film thus obtained was as follows: screen gain (Go) of 1.1, α-value of 35.1 degrees and β-value of 46.5 degrees.

Formation of Second Light Diffusion Layer

Spherical silicone resin fine particles having a weight average particle diameter of 2 μm (TOSPEARL 120 (TP120), produced by Toshiba Silicone Co., Ltd.: refractive index of 1.42) were added as the light diffuser 11B in the partially polymerized composition of methacrylic resin by 0.25 wt %, and then the polymerization was carried out to obtain a light diffusion sheet 11 (second light diffusion layer) having a thickness of 1000 μm. In the methacrylic resin light diffusion sheet constituting the second light diffusion layer 11, the light diffuser was uniformly dispersed and the Haze value of the sheet was equal to 68%.

Lamination of First Light Diffusion Layer 7, Polarizing Film 9 and Second Light Diffusion Layer 11

The first light diffusion layer 7, the polarizing film 9 (KN-18242TD, produced by Polatechno Co., Ltd.: transmittance of 42%: polarization degree of 99.99%) having pressure sensitive adhesive layers 8, 10 on both the surfaces thereof, and the second light diffusion layer 11 were laminated by a laminate method so that the first light diffusion layer 7 was disposed on one surface of the polarizing film 9 and the second light diffusion layer 11 was disposed on the other surface of the polarizing film 9, thereby obtaining a rear projection screen having a thickness of 1310 μm as shown in FIG. 6. The rear projection screen thus obtained was rectangular. Since the direction of the polarization axis of the projected light from a liquid crystal projector XVE-500 produced by Sharp Corp. used as a light source in combination with the rear projection screen was perpendicular to the plane of the floor, the lamination was carried out under such an arrangement that the polarized light transmission axis of the polarized film 9 was parallel to the sides of the rear projection screen to be arranged vertically.

Measurement of Characteristics of Screen

The measurement results of the gain (Go), the α-value, the β-value, the resolution (MTF) and the contrast and the observation result of the speckle of the screen which was disposed so that the first light diffusion layer 7 was located at the light source side and the second light diffusion layer 11 was located at the viewing side are shown in Table 3. Since the distance from the incident face (the opposite surface to the polarizing film 9) of the first light diffusion layer 7 to the emission face (the opposite surface to the polarizing film 9) of the second light diffusion layer 11 was less than 1.5 mm, no speckle occurred while it had a high resolution (MTF) of 25%, and the angle of visual field was sufficient because the α-value was equal to 36 degrees. In addition, the contrast was high (0.95), and an image having no unevenness in light and shade could be obtained with the brightness being uniform over the overall image. Further, no moire occurred.

EXAMPLE 8

Formation of Second Light Diffusion Layer and Transparent Plastic Sheet

The same light diffuser 11B as used in Example 7 was added at the same concentration into methacrylic resin pellets (ACRYPET VH, produced by Mitsubishi Rayon Co., Ltd.) and dispersed by using Henschel mixer, and the acrylic resin pellet containing the light diffuser was formed by using a double screw extruder of 30 mm φ. The pellet thus obtained and methacrylic resin pellet (ACRYPET VH, produced by Mitsubishi Rayon Co., Ltd.) were sheeted by using a co-extruding method to obtain a laminate sheet in which the second light diffusion layer 11 of 1000 82 m in thickness and the transparent plastic sheet 12 of 3000 μm in thickness were integrated with each other. The light diffuser was uniformly dispersed in the second light diffusion layer 11 of the laminate sheet. The optical characteristics of the second light diffusion layer 11 thus obtained was the same as those of Example 7.

Lamination of First Light Diffusion Layer 7, Polarizing Film 9, Second Light Diffusion Layer 11 and Transparent Plastic Sheet 12

The laminate sheet of the second light diffusion layer 11 and the transparent plastic sheet 12 thus obtained and the first light diffusion layer 7 and the polarizing film 9 used in Example 7 were integrally laminated by the laminate method, thereby obtaining a rear projection screen of 4310 μm as shown in FIG. 7.

Measurement of Characteristics of Screen

The measurement results of the gain (Go), the α-value, the β-value, the resolution (MTF) and the contrast and the observation result of the speckle of the screen which was disposed so that the first light diffusion layer 7 was located at the light source side and the transparent plastic sheet 12 was located at the viewing side are shown in Table 3. Since the transparent plastic sheet 12 of 3 mm in thickness was integrally laminated, the rigidity of the rear projection screen was enhanced, and the setup of the screen to the housing could be easily performed.

EXAMPLE 9

A rear projection screen as shown in FIG. 7 was formed in the same manner as Example 8 except that methacrylic resin pellet containing carbon black as coloring agent was used so that the total-light transmittance of the transparent plastic sheet 12 was equal to 78%.

The rear projection screen thus obtained was disposed so that the first light diffusion layer 7 was located at the light source side and the transparent plastic sheet 12 was located at the viewing side. The measurement results of the gain (Go), the α-value, the β-value, the resolution (MTF) and the contrast and the observation result of the speckle of this screen are shown in Table 3. Since light absorber was added in the transparent plastic sheet 12 was added, higher contrast could be obtained as compared with those of Examples 7 and 8.

EXAMPLE 10

A linear Fresnel lens member 13 having a focal length of 500 mm was joined to one surface of the first light diffusion layer 7 formed in the same manner as Example 7. The forming of the linear Fresnel lens member 21 was carried out by injecting into a linear Fresnel lens mold ultraviolet-ray curable resin liquid which was prepared so as to have a refractive index of 1.53 after cured, overlaying the light diffusion layer 7 on the ultraviolet-ray curable resin liquid and then irradiating ultraviolet rays to cure the ultraviolet-ray curable resin to provide the resin with a form. The polarizing film 9 was joined to the opposite surface of the first light diffusion layer 7 to the linear Fresnel lens member 21, and a rear projection screen as shown in FIG. 9 was obtained in the same manner as Example 7.

Measurement of Characteristics of Screen

The rear projection screen was disposed so that the linear Fresnel lens member 21 was located at the light source side and the second light diffusion layer 11 was located at the viewing side. The measurement results of the gain (Go), the α-value, the β-value, the resolution (MTF) and the contrast and the observation result of the speckle of this screen are shown in Table 3. Since the linear Fresnel lens member 21 is provided at the incident face side of the first light diffusion layer 7, the brightness at the corners of the screen was enhanced and high brightness uniformity could be achieved over a wide angle of visual field.

EXAMPLE 11

A rear projection screen having a thickness of 3310 μm as shown in FIG. 6 was formed in the same manner as Example 7 except that the addition amount of the light diffuser 11B was set to 0.83 wt % when the second light diffusion layer 11 was formed, and the thickness thereof was set to 3000 μm. The Haze value of the second light diffusion layer thus obtained was equal to 89.3%.

The rear projection screen thus obtained was disposed so that the first light diffusion layer 7 was located at the light source side and the second light diffusion layer 11 was located at the viewing side. The measurement results of the gain (Go), the α-value, the β-value, the resolution (MTF) and the contrast and the observation result of the speckle of this screen are shown in Table 3. No speckle occurred, the angle of visual field was satisfactory because the α-value was equal to 37.2 degrees, and the contrast was also high (0.95). Therefore, an image having no unevenness in light and shade could be achieved with the brightness being uniform over the overall image. However, the distance from the incident face of the first light diffusion layer 7 to the emission face of the second light diffusion layer 11 was large (3310 μm), and the Haze value of the second light diffusion layer 11 was relatively high (89.3%), so that the resolution (MTF) was somewhat low (12%).

Comparative Example 9

The measurement results of the characteristics of the rear projection screen comprising only the first light diffusion layer obtained in Example 7 are shown in Table 3. MTF was equal to 60% which indicated high resolution, and the angle of visual field was satisfactory because the α-value was equal to 35.1 degrees. However, strong speckle occurred and the contrast was low (0.83) because no polarizing film 9 was used, so that an image was hard to see.

Reference Example 1

A rear projection screen was formed in the same manner as Example 7 except that EN-1825TD (transmittance of 44%, polarization degree of 95%) produced by Polatechno Co., Ltd. was used as the polarizing film 9.

The rear projection screen thus obtained was disposed so that the first light diffusion layer 7 was located at the light source side and the second light diffusion layer 11 was located at the viewing side. The measurement results of the gain (Go), the α-value, the β-value, the resolution (MTF) and the contrast and the observation result of the speckle of this screen are shown in Table 3. No speckle occurred, and the angle of visual field was satisfactory because the α-value was equal to 36.2 degrees. Therefore, an image having no unevenness in light and shade was obtained with the brightness being uniform over the overall image. However, since the polarization degree of the polarizing film 9 was low (95%), the contrast was slightly low (0.89).

TABLE 3

| | Go | α-VALUE (DEGREE) | β-VALUE (DEGREE) | THICKNESS (μm) | CONTRAST | MTF (%) | OCCURRENCE OF SPECKLE |
|---|---|---|---|---|---|---|---|
| EX. 7 | 1.0 | 36.0 | 47.9 | 1310 | 0.95 | 25 | NO |
| EX. 8 | 1.0 | 36.0 | 47.9 | 4310 | 0.95 | 25 | NO |
| EX. 9 | 0.9 | 35.5 | 47.1 | 4310 | 0.97 | 25 | NO |
| EX. 10 | 1.0 | 34.0 | 46.0 | 1310 | 0.95 | 25 | NO |
| EX. 11 | 0.9 | 37.2 | 48.5 | 3310 | 0.95 | 12 | NO |
| COMP. EX. 9 | 1.1 | 35.1 | 46.5 | 80 | 0.83 | 60 | STRONGLY OCCURRING |
| REF. EX. 1 | 1.0 | 36.2 | 48.0 | 1310 | 0.89 | 25 | NO |

EXAMPLE 12

Formation of Light Diffusion Layer

Silicone resin spherical fine particles (X52-1186, produced by Shin-Etsu Chemical Co., Ltd.: volume average particle diameter of 3.5 μm: refractive index of 1.42) were added as the light diffuser 13B into methacrylic resin (ACRYPET VH#001, produced by Mitsubishi Rayon Co., Ltd.: refractive index of 1.49) so that the concentration thereof was equal to 35 g/m² with respect to the transparent resin constituting the rear projection screen, and a light diffusion sheet 13 having a thickness of 0.4 mm was manufactured by the extrusion method. The characteristics of the light diffusion sheet 13 is shown in Table 4.

Manufacturing of Screen

An antireflection film 17 (REALOOK 2201, produced by NOF Corp.) serving as an antireflection layer having an antireflection film formed on one surface of TAC film and a pressure sensitive adhesive layer formed on the other surface thereof was laminated through the pressure sensitive adhesive layer onto one surface of a transparent methacrylic resin plate of 4 mm in thickness (ACRYLITE #001, produced by Mitsubishi Rayon Co., Ltd.) serving as the colorless or colored transparent plastic sheet 16 by the laminate method. Further, the polarizing film 15 (KN18242T, produced by Polatechno Co., Ltd.: polarization degree of 99, 99%, transmittance of 42%) was laminated onto one surface of the plastic sheet 16 on one surface of which the antireflection layer 17 was laminated. The light diffusion sheet 13 was integrally laminated on the plastic sheet with the polarizing film 15 to obtain rear projection screen 14 as shown in FIG. 11. The characteristics of the rear projection screen thus obtained is shown in Table 5.

A picture was projected onto the rear projection screen 14 and then the projected picture was observed under the state that the rear projection screen 14 was disposed so that the polarized light transmission axis of the polarizing film 15 constituting the rear projection screen 14 was parallel to the polarization axis of the light from the projector. As a result, speckle little appeared, and a high-quality image could be achieved with high resolution and sharp contrast. Further, the reflection of the external light was suppressed, and occurrence of moire and see-through and coloring were not observed.

EXAMPLE 13

A rear projection screen having the construction shown in FIG. 11 was formed in the same manner as Example 12 except that a colored methacrylic resin plate (ACRYLITE #099, produced by Mitsubishi Rayon Co., Ltd.) which was added with dye as light absorber and had total-light transmittance of 79% was used in place of the transparent methacrylic resin used in Example 12. The characteristics of the rear projection screen thus obtained are shown in the table 5.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, little speckle occurred, and a high-quality picture could be achieved with high resolution and sharp contrast. Further, the reflection of the external light was suppressed, and occurrence of moire and see-through and coloring were not observed.

EXAMPLE 14

The antireflection layer 17, the polarizing film 15, the transparent plastic sheet 16 and the light diffusion layer 13 were laminated in this order from the viewing side by using the same materials as Example 12 to obtain rear projection screen 18 having the construction shown in FIG. 12. The characteristics of the rear projection screen are shown in Table 5.

A picture was projected onto the rear projection screen 18 thus obtained and then the projected picture was observed under the state that the rear projection screen 18 was disposed so that the polarized light transmission axis of the polarizing film 15 constituting the rear projection screen 18 was parallel to the polarization axis of the light from the projector. As a result, little speckle occurred, and a high-quality picture could be achieved with high resolution and sharp contrast. Further, the reflection of the external light was suppressed, and occurrence of moire and see-through and coloring were not observed.

EXAMPLE 15

Figure 13:
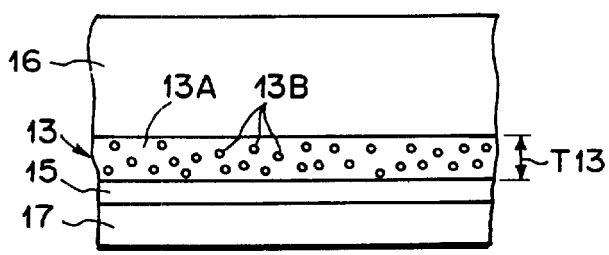
FIG. 13 is a schematic partial cross-sectional view showing the construction of an embodiment of the rear projection screen according to the present invention.

The antireflection layer 17, the polarizing film 15, the light diffusion layer 13 and the transparent plastic sheet 16 were laminated in this order from the viewing side by using the same materials as Example 12 to obtain rear projection screen 19 having the construction shown in FIG. 13. The characteristics of the rear projection screen 19 are shown in Table 5.

A picture was projected onto the rear projection screen 19 thus obtained and then the projected picture was observed under the state that the rear projection screen 19 was disposed so that the polarized light transmission axis of the polarizing film 15 constituting the rear projection screen 19 was parallel to the polarization axis of the light from the projector. As a result, little speckle occurred, and a high-quality picture could be achieved with high resolution and sharp contrast. Further, the reflection of the external light was suppressed, and occurrence of moire and see-through and coloring were not observed.

EXAMPLE 16

A rear projection screen having the construction shown in FIG. 11 was formed in the same manner as Example 12 except that spherical coated particles (KMP600, produced by Shin-Etsu Chemical Co., Ltd.: volume average particle diameter of 5 $\mu$m: refractive index of silicone rubber spherical particles of 1.40: refractive index of polyorganosilsesquioxane resin of 1.42) obtained by forming a resin layer of polyorganosilsesquioxane resin on the surface of each of silicone rubber spherical particles were used as the light diffuser used in Example 12 at a concentration of 18 g/m$^2$ with respect to the transparent resin constituting the rear projection screen and the thickness of the light diffusion sheet was equal to 0.36 mm. The characteristics of the rear projection screen thus obtained are shown in Table 5.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, little speckle occurred, and a high-quality picture could be achieved with high resolution and sharp contrast. Further, the reflection of the external light was suppressed, and occurrence of moire and see-through and coloring were not observed.

Comparative Example 10

Rear projection screen 14 having the construction shown in FIG. 11 was formed in the same manner as Example 12 except that the thickness of the light diffusion sheet 13 manufactured in Example 12 was equal to 1.4 mm. The characteristics of the light diffusion sheet thus obtained are shown in Table 4, and the characteristics of the rear projection screen 14 are shown in Table 5.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, no speckle occurred because the thickness of the light diffusion layer was large. However, the resolution (MTF) was low (5%), and the projected picture was unclear.

Comparative Example 11

Rear projection screen 14 having the construction shown in FIG. 11 was formed in the same manner as Example 12 except that the thickness of the light diffusion sheet 13 manufactured in Example 12 was equal to 0.2 mm. The characteristics of the light diffusion sheet 13 thus obtained are shown in Table 4, and the characteristics of the rear projection screen 14 are shown in Table 5.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, the resolution (MTF) was high (65%), and thus the projected picture was very clear. However, the speckle appeared strongly, and the picture was very hard to see.

Comparative Example 12

Rear projection screen 14 having the construction shown in FIG. 11 was formed in the same manner as Example 12 except that a member in which the addition amount of the light diffuser with respect to the transparent resin constituting the rear projection screen 14 was equal to 65 g/m² was used as the light diffusion sheet 13. The characteristics of the light diffusion sheet 13 thus obtained are shown in Table 4, and the characteristics of the rear projection screen 14 are shown in Table 5.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, little speckle occurred, however, the picture was hard to see because the rear projection screen was excessively dark.

Comparative Example 13

Rear projection screen 14 having the construction shown in FIG. 11 was formed in the same manner as Example 12 except that a member obtained by adding low-density polyethylene resin spherical fine particles (FLO-BEADS LE-1080, produced by Sumitomo Seika Chemicals Co. Ltd.: volume average particle diameter of 6.0 μm) at a concentration of 65 g/m² to the transparent resin constituting the rear projection screen 14 was used as the light diffusion sheet 13. The characteristics of the light diffusion sheet 13 thus obtained are shown in Table 4, and the characteristics of the rear projection screen 14 are shown in Table 5.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, the retention P of the polarization degree of the projected light was low (34%), and thus the picture was low in brightness and colored.

TABLE 4

|  | THICKNESS OF LIGHT DIFFUSION LAYER (mm) | VOLUME AVERAGE PARTICLE DIAMETER OF LIGHT DIFFUSER (μm) | CONCENTRATION OF LIGHT DIFFUSER (g/m²) | Go | α-VALUE (DEGREE) |
|---|---|---|---|---|---|
| EX. 12–15 | 0.4 | 3.5 | 35.0 | 1.0 | 40.0 |
| EX. 16 | 0.36 | 5.0 | 18.0 | 1.35 | 31.6 |
| COMP. EX. 10 | 1.4 | 3.5 | 35.0 | 1.0 | 40.0 |
| COMP. EX. 11 | 0.2 | 3.5 | 35.0 | 1.0 | 40.0 |
| COMP. EX. 12 | 0.4 | 3.5 | 65.0 | 0.4 | 57.0 |
| COMP. EX. 13 | 0.4 | 6.0 | 65.0 | 1.0 | 32.0 |

TABLE 5

|  | Go | α-VALUE (DEGREE) | MTF (%) | SPECKLE | SEE-THROUGH | RETENTION OF POLARIZATION DEGREE | CONTRAST |
|---|---|---|---|---|---|---|---|
| EX. 12 | 0.75 | 38.0 | 55.0 | WEAK | NO | 92.0 | 0.95 |
| EX. 13 | 0.65 | 37.5 | 30.0 | WEAK | NO | 92.0 | 0.95 |
| EX. 14 | 0.75 | 38.0 | 55.0 | WEAK | NO | 92.0 | 0.95 |
| EX. 15 | 0.75 | 38.0 | 55.0 | WEAK | NO | 92.0 | 0.95 |
| EX. 16 | 1.10 | 29.6 | 85.0 | WEAK | NO | 93.0 | 0.96 |
| COMP. EX. 10 | 0.75 | 38.0 | 5.0 | WEAK | NO | 92.0 | 0.95 |
| COMP. EX. 11 | 0.75 | 38.0 | 65.0 | STRONG | NO | 92.0 | 0.95 |
| COMP. EX. 12 | 0.40 | 53.0 | 35.0 | WEAK | NO | 90.0 | 0.90 |
| COMP. EX. 13 | 0.45 | 30.0 | 53.0 | WEAK | NO | 34.3 | — |

Comparative Example 14

Rear projection screen 14 having the construction shown in FIG. 11 was formed in the same manner as Example 12 except that a member in which silicone resin spherical fine particles (TOSPEARL 3120, produced by Toshiba Silicone Co., Ltd.: volume average particle diameter of 12.0 μm: refractive index of 1.42) were added at a concentration of 70 g/m² to transparent resin constituting the rear projection screen 14 was used as the light diffusion sheet 13. The screen gain (Go) of the light diffusion sheet 13 was equal to 5.8, and the α-value thereof was equal to 13.1 degrees.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, the light diffusion property was low and thus the angle of visual field was very small because the particle diameter of the light diffuser was large.

Comparative Example 15

Rear projection screen 14 having the construction shown in FIG. 11 was formed in the same manner as Example 12 except that a member in which silicone resin spherical fine particles (TOSPEARL 105, produced by Toshiba Silicone Co., Ltd.: volume average particle diameter of 0.5 μm: refractive index of 1.42) were added at a concentration of 70 g/m² to transparent resin constituting the rear projection screen 14 was used as the light diffusion sheet 13.

A picture was projected onto the rear projection screen 14 thus obtained and then the projected picture was observed under the state that the rear projection screen 14 was disposed so that the polarized light transmission axis of the polarizing film 15 constituting the rear projection screen 14 was parallel to the polarization axis of the light from the projector. As a result, the picture was colored with yellow because the particle diameter of the light diffuser was small, and also see-through phenomenon was observed.

EXAMPLE 17

A linear Fresnel lens sheet having a focal length of 500 mm was disposed at the light source side of the rear projection screen 14 obtained in Example 12 so that linear Fresnel lens extends in the longitudinal direction. A picture was projected onto the rear projection screen thus obtained and then the projected picture was observed under the state that the rear projection screen was disposed so that the polarized light transmission axis of the polarizing film constituting the rear projection screen was parallel to the polarization axis of the light from the projector. As a result, the brightness at the four corners of the rear projection screen can be enhanced, and the picture could be easily visualized.

EXAMPLES 18 to 22
Formation of Light Diffusion Sheet

Spherical coated particles (KMP600, produced by Shin-Etsu Chemical Co., Ltd.: volume average particle diameter of 5 μm: refractive index of silicone rubber spherical particles of 1.40: refractive index of polyorganosilsesquioxane resin of 1.42: JIS A hardness of 30) obtained by forming a resin layer of polyorganosilsesquioxane resin on the surface of each of silicone rubber spherical particles were added as the light diffuser to methacrylic resin (ACRYPET VI#001, produced by Mitsubishi Rayon Co., Ltd.: refractive index of 1.49) so that the concentration shown in Table 6 was obtained, and light diffusion sheet was manufactured by the extrusion method. No agglomeration of the light diffuser was observed, and the light diffuser could be easily dispersed in the methacrylic resin.

Figure 18:
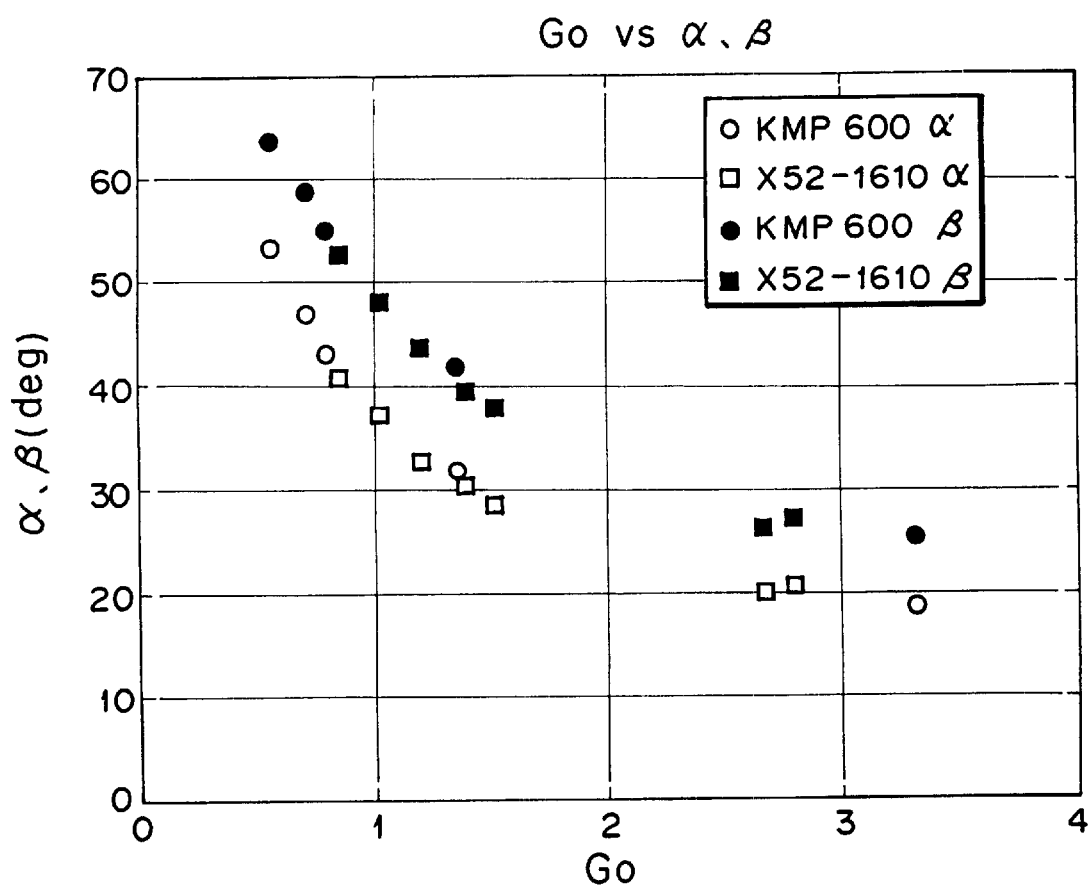
FIG. 18 is a graph showing the relationship between the screen gain ($G_o$) and $\alpha$-value, $\beta$-value in the embodiment of the light diffusing sheet using the spherical coated particles of the present invention and a comparative example.

No agglomerate of the light diffuser was observed in the light diffusion sheet thus obtained, no stock of the resin at the die lip portion occurred, and the light diffusion sheet could be obtained continuously and stably. The optical characteristics of the light diffusion sheet thus obtained are shown in Table 6, and the relationship between the screen gain (Go) and the α-value or β-value is shown in FIG. 18.

Comparative Examples 16 and 17, Reference Examples 2 to 6
Formation of Light Diffusion Sheet Spherical fine particles (X52-1186, produced by Shin-Etsu Chemical Co., Ltd.: volume average particle diameter of 3.5 μm: refractive index of polyorganosilsesquioxane resin of 1.42) formed of polyorganosilsesquioxane resin were added as the light diffuser to methacrylic resin (ACRYPET VH#001, produced by Mitsubishi Rayon Co., Ltd.: refractive index of 1.49) so that the concentration shown in Table 6 was obtained, and light diffusion sheet was manufactured by the extrusion method. No agglomeration of the light diffuser was observed, and the light diffuser could be easily dispersed in the methacrylic resin.

No agglomerate of the light diffuser was observed in the light diffusion sheet thus obtained. However, a lot of resin adhered to the die lip portion with time lapse from the start of the extrusion and was stocked there, so that outlook defect of the light diffusion sheet occurred and it was difficult to continuously produce the light diffusion sheet stably. The optical characteristics of the light diffusion sheet thus obtained (Tt represents the total-light transmittance) are shown in Table 6, and the relationship between the screen gain (Go) and the α-value or β-value is shown in FIG. 18.

TABLE 6

| | LIGHT DIFFUSER | | | | | | | |
|---|---|---|---|---|---|---|---|---|
| | KIND | ADDITION AMOUNT (g/m²) | THICKNESS (mm) | Tt (%) | Haze (%) | Go | α-VALUE (DEGREE) | β-VALUE (DEGREE) |
| EX. 18 | KMP600 | 59.2 | 0.64 | 66.3 | 86.6 | 0.56 | 53.0 | 63.7 |
| EX. 19 | KMP600 | 35.0 | 0.50 | 71.9 | 89.6 | 0.71 | 47.0 | 58.8 |
| EX. 20 | KMP600 | 30.0 | 0.60 | 74.5 | 89.5 | 0.80 | 42.7 | 54.7 |
| EX. 21 | KMP600 | 18.0 | 0.36 | 83.2 | 89.4 | 1.35 | 31.6 | 41.8 |
| EX. 22 | KMP600 | 9.8 | 0.20 | 90.2 | 88.2 | 3.31 | 18.7 | 25.4 |
| COMP. EX. 16 | X52-1186 | 46.9 | 0.20 | 73.2 | 89.5 | 0.85 | 40.5 | 52.3 |
| COMP. EX. 17 | X52-1186 | 40.8 | 0.29 | 78.0 | 89.5 | 1.02 | 37.0 | 47.9 |
| REF. EX. 2 | X52-1186 | 39.1 | 0.50 | 81.4 | 89.4 | 1.20 | 32.5 | 43.3 |
| REF. EX. 3 | X52-1186 | 32.0 | 0.40 | 83.9 | 89.3 | 1.39 | 30.3 | 39.6 |
| REF. EX. 4 | X52-1186 | 28.5 | 0.50 | 84.1 | 89.3 | 1.53 | 28.5 | 37.9 |
| REF. EX. 5 | X52-1186 | 17.7 | 0.35 | 88.9 | 88.6 | 2.80 | 20.3 | 26.9 |
| REF. EX. 6 | X52-1186 | 20.0 | 0.40 | 89.3 | 88.6 | 2.68 | 20.0 | 26.3 |

EXAMPLES 23 and 24, Comparative Examples 18 to 20
Formation of Light Diffusion Sheet Spherical coated particles (KMP600, produced by Shin-Etsu Chemical Co., Ltd.: volume average particle diameter of 5 μm, refractive index of silicone rubber spherical particles of 1.40: refractive index of polyorganosilsesquioxane resin of 1.42: JIS A hardness of 30) obtained by forming a resin layer of polyorganosilsesquioxane resin on the surface of each of silicone rubber spherical particles were added as the light diffuser to methacrylic resin (ACRYPET VH#001, produced by Mitsubishi Rayon Co., Ltd.: refractive index of 1.49) so that the concentration shown in Table 7 was obtained, and light diffusion sheet was manufactured by the extrusion method.

In any case, no agglomeration of the light diffuser was observed, and the light diffuser could be easily dispersed in methacrylic resin. No agglomerate of the light diffuser was observed in the light diffusion sheet thus obtained, no stock of the resin at the die lip portion occurred, and the light diffusion sheet could be obtained continuously and stably. The mechanical characteristics of the light diffusion sheet thus obtained are shown in Table 7.

TABLE 7

| | LIGHT DIFFUSER | | | | |
|---|---|---|---|---|---|
| | KIND | ADDITION AMOUNT (g/m$^2$) | THICKNESS (mm) | E50 (J) | αki (KJ/m$^2$) |
| EX. 23 | KMP600 | 35.7 | 3.0 | 2.1 | 0.84 |
| EX. 24 | KMP600 | 71.4 | 3.0 | 2.1 | 0.81 |
| COMP. EX. 18 | KMP600 | — | 3.0 | 1.4 | 0.48 |
| COMP. EX. 19 | KMP600 | 107.1 | 3.0 | 1.9 | 0.84 |
| COMP. EX. 20 | KMP600 | 178.5 | 3.0 | 2.0 | 0.83 |

As is apparent from Tables 6 and 7, the light diffusion property of the light diffusion sheet of the examples of the present invention was high as those of the light diffusion sheets of the comparative examples 16, 17 and the reference examples 2 to 6 in which the silicone resin fine particles were added as the light diffuser. In the light diffusion sheet of the present invention, no resin is stocked at the die lip portion, and the sheet can be continuously produced stably. In addition, impact resistance can be greatly enhanced.

EXAMPLE 25
Formation of Light Diffusion Sheet

Spherical coated particles (KMP600, produced by Shin-Etsu Chemical Co., Ltd.: volume average particle diameter of 5 μm, refractive index of silicone rubber spherical particles of 1.40: refractive index of polyorganosilsesquioxane resin of 1.42: JIS A hardness of 30) obtained by forming a resin layer of polyorganosilsesquioxane resin on the surface of each of silicone rubber spherical particles were added as the light diffuser to methacrylic resin (ACRYPET VH#001, produced by Mitsubishi Rayon Co., Ltd.: refractive index of 1.49) by 7.7 wt % (concentration of 18.5 g/m$^2$), and light diffusion sheet having a thickness of 0.2 mm was formed by the extrusion method. In the characteristics of the light diffusion sheet thus obtained, the total-light transmittance was equal to 83.3%, the Haze value was equal to 89.3%, the screen gain (Go) was equal to 1.4, the α-value was equal to 31 degrees and the β-value was equal to 41 degrees.
Manufacturing of Rear Projection Screen An antireflection film (REALOOK 2201 [trade name], produced by NOF Corp.) serving as the antireflection layer and comprising an antireflection film formed on one surface of a TAC film and an adhesive layer formed on the other surface of the TAC film was joined onto one surface of a transparent methacrylic resin plate (ACRYLITE #001 [trade name] #001, produced by Mitsubishi Rayon Co., Ltd.) having a thickness of 4 mm as a transparent plastic sheet through the adhesive layer by the laminate method. A polarizing film (KN18242T [trade name], produced by Polatechno Co., Ltd.: polarization degree of 99.99%: transmittance of 42%) was laminated by the laminate method on the opposite surface of the plastic sheet 16 to the surface on which the antireflection layer 17 was formed, so that the polarized light transmission axis of the polarizing film was parallel to the polarization axis of the light from the liquid crystal projector. On the sheet thus obtaibned the light diffusion sheet 13 obtained as described above was further integrally laminated to form a rear projection screen having the construction shown in FIG. 11. The light diffusion sheet 13 could be easily laminated because the shock resistance thereof was high although the thickness thereof was small (0.2 mm).

As a result of the measurements of the characteristics of the rear projection screen thus obtained, the screen gain (Go) was equal to 1.2, and the α-value was equal to 29 degrees and the β-value was equal to 39 degrees, which indicated that the screen had a very wide angle of visual field. A picture was actually projected and observed. As a result, there could be obtained a rear projection screen which could suppress the loss of the projected light to the minimum level and had high contrast because the polarizing film was laminated so that the polarized light transmission axis thereof and the polarization axis of the projected light from the projector are in the same direction.

EXAMPLE 26

Transparent methacrylic resin plate (ACRYLITE #001 [trade name], produced by Mitsubishi Rayon Co., Ltd.) having a thickness of 4 mm as a transparent plastic sheet and the light diffusion sheet obtained in Example 25 were integrated with each other by using the hot press method. Further, the same antireflection layer as used in Example 25 and the same polarizing film as used in Example 25 were laminated on each other through the adhesive layer by the laminate method so that the polarized light transmission axis of the polarizing film was parallel to the polarization axis of the projected light from the liquid crystal projector. The integral sheet thus obtained was laminated on the integral sheet of the transparent plastic sheet and the light diffusion sheet described above through the adhesive layer to obtain a rear projection screen having the construction shown in FIG. 12. The characteristics of the rear projection screen had very excellent performance like those of the rear projection screen of the example 25.

EXAMPLE 27

A rear projection screen having the construction shown in FIG. 14 was formed with the same manner and members as the Example 25 except that a colored methacrylic resin plate (ACRYLITE #001 [trade name] #099, produced by Mitsubishi Rayon Co., Ltd.) of 4 mm in thickness and 79% in total-light transmittance which was added with dye as light absorber was used as the transparent plastic sheet and no polarizing film was used.

As a result of the measurements of the characteristics of the rear projection screen thus obtained, the screen gain (Go) was equal to 1.0, and the α-value was equal to 28 degrees and the β-value was equal to 37 degrees, which indicated that the screen had a very wide angle of visual field. A picture was actually projected and observed. As a result, a rear projection screen having higher contrast could be obtained because the transparent plastic sheet added with the light absorber (dye) was used.

EXAMPLE 28

Colored methacrylic resin plate (ACRYLITE #097 [trade name], produced by Mitsubishi Rayon Co., Ltd.) of 4 mm in thickness and 64% in total-light transmittance which was added with dye as light absorber, and the light diffusion sheet obtained in Example 25 were integrated with each other by the hot press method. Further, on the viewing-side surface of the integrated sheet the same antireflection layer as used in Example 25 was laminated through the adhesive layer by the laminate method to obtain a rear projection screen having the construction shown in FIG. 14.

As a result of the measurements of the characteristics of the rear projection screen thus obtained, the screen gain (Go) was equal to 0.9, and the α-value was equal to 28 degrees and the β-value was equal to 37 degrees, which indicated that the screen had a very wide angle of visual field. A picture was actually projected and observed. As a result, a rear projection screen having higher contrast could be obtained because the transparent plastic sheet having the total-light transmittance of 70% or less.

Industrial Applicability

Since the rear projection screen of the present invention is designed as described above, in addition to the effect that a projected picture having high resolution can be obtained, when the screen size is relatively small (14 to 40 inches) and it is particularly used in combination with a projector having high brightness, a sufficient angle of visual field can be obtained in both the horizontal and vertical directions without using any lenticular lens for enlarging the angle of visual field in only one of the horizontal and vertical directions. Further, occurrence of moire due to the relationship between LCD or DMD and lenticular lense can be prevented because no lenticular lense is used, and the screen can be easily manufactured and handled because lenticular lense of a minute pitch are not used. Still further, the present invention can provide a light diffusion sheet which is excellent in dispersibility of light diffusion particles into transparent resin and also excellent in shock resistance, light transmission and light diffusion properties, and also can provide a rear projection screen which is excellent in shock resistance and light transmission and has a sufficiently wide angle of visual field.

What is claimed is:

1. A rear projection screen onto which an optical image formed on a light valve having picture element portions arranged in a matrix form is projected, comprising at least a first light diffusion layer and a second light diffusion layer, said first light diffusion layer being disposed nearer to said light valve than said second light diffusion layer, wherein said first light diffusion layer comprises a first base material formed of transparent resin and a first light diffuser formed of transparent fine particles contained in said first base material by 20 to 50 wt %, the difference in refractive index between said first base material and said first light diffuser being equal to 0.07 to 0.17, the weight average particle diameter of said first light diffuser being equal to 1 to 12 $\mu$m, the thickness of said first light diffusion layer being set to 50 to 200 $\mu$m, and said second light diffusion layer comprises a second base material formed of transparent resin and a second light diffuser which is formed of transparent fine particles having a weight average particle diameter of 1 to 12 $\mu$m, the thickness of said second light diffusion layer being set to 500 to 5000 $\mu$m and the haze value of said second light diffusion layer being set to 50 to 85%.

2. A rear projection screen onto which an optical image formed on a light valve having picture element portions arranged in a matrix form is projected, comprising at least a first light diffusion layer and a second light diffusion layer, said first light diffusion layer-being disposed nearer to said light valve than said second light diffusion layer, wherein said first light diffusion layer comprises a first base material formed of transparent resin and a first light diffuser formed of transparent fine particles contained in said first base material by 20 to 50 wt %, the difference in refractive index between said first base material and said first light diffuser being equal to 0.07 to 0.17, the weight average particle diameter of said first light diffuser being equal to 1 to 12 $\mu$m, the thickness of said first light diffusion layer being set to 50 to 200 $\mu$m, and said second light diffusion layer comprises a second base material formed of transparent resin and a second light diffuser which is contained in said second base material by 0.1 to 10.0 wt % and formed of transparent fine particles having a weight average particle diameter of 1 to 12 $\mu$m, the thickness of said second light diffusion layer being set to 500 to 5000 $\mu$m.

3. The rear projection screen as claimed in any one of claims 1 and 2, wherein said first light diffusion layer and said second light diffusion layer are laminated in contact with each other.

4. The rear projection screen as claimed in any one of claims 1 and 2, wherein said first base material and said second base material are formed of the same resin.

5. The rear projection screen as claimed in any one of claims 1 and 2, wherein the opposite surface of said first light diffusion layer to said second light diffusion layer or the opposite surface of said second light diffusion layer to said first light diffusion layer is designed as a linear Fresnel lens face.

6. The rear projection screen as claimed in any one of claims 1 and 2, wherein a linear Fresnel lens member is disposed at the opposite side of said first light diffusion layer to said second light diffusion layer.

7. The rear projection screen as claimed in any one of claims 1 and 2, wherein a transparent plastic layer is interposed between said first light diffusion layer and said second light diffusion layer.

8. The rear projection screen as claimed in claim 7, wherein light absorber is contained in said transparent plastic layer.

9. The rear projection screen as claimed in any one of claims 1 and 2, wherein light absorber is contained in at least one of said first light diffusion layer and said second light diffusion layer.

10. The rear projection screen as claimed in any one of claims 1 and 2, further including a polarizing film layer.

11. The rear projection screen as claimed in claim 10, wherein the polarization degree of said polarizing film layer is equal to 96% or more.

12. The rear projection screen as claimed in any one of claims 1 and 2, wherein an antireflection layer is formed on at least one surface of the screen.

* * * * *

UNITED STATES PATENT AND TRADEMARK OFFICE
CERTIFICATE OF CORRECTION

PATENT NO. : 6,556,347 B1
DATED : April 29, 2003
INVENTOR(S) : Yoshiaki Murayama et al.

It is certified that error appears in the above-identified patent and that said Letters Patent is hereby corrected as shown below:

<u>Title page,</u>
Item [73], Assignee, delete "Mitsubisi Rayon Co., Ltd." and insert
-- Mitsubishi Rayon Co., Ltd. --

Signed and Sealed this

Twenty-third Day of September, 2003

JAMES E. ROGAN
*Director of the United States Patent and Trademark Office*